US008390961B2

(12) United States Patent
Fujimoto et al.

(10) Patent No.: US 8,390,961 B2
(45) Date of Patent: Mar. 5, 2013

(54) MAGNETIC HEAD SUSPENSION HAVING A SUPPORT PLATE CONNECTED TO THE LOWER SURFACE OF THE SUPPORTING PART

(75) Inventors: Yasuo Fujimoto, Kyoto-fu (JP); Satoru Takasugi, Kyoto-fu (JP)

(73) Assignee: Suncall Corporation, Kyoto-Fu (JP)

( * ) Notice: Subject to any disclaimer, the term of this patent is extended or adjusted under 35 U.S.C. 154(b) by 286 days.

(21) Appl. No.: 12/732,692

(22) Filed: Mar. 26, 2010

(65) Prior Publication Data

US 2010/0246067 A1   Sep. 30, 2010

(30) Foreign Application Priority Data

Mar. 26, 2009 (JP) ................................. 2009-076558
Mar. 3, 2010 (JP) ................................. 2010-046219

(51) Int. Cl.
*G11B 5/58* (2006.01)
*G11B 21/10* (2006.01)
(52) U.S. Cl. .................................................. 360/294.4
(58) Field of Classification Search ............... 360/294.4, 360/294.7
See application file for complete search history.

(56) References Cited

U.S. PATENT DOCUMENTS 6,239,953 B1 * 5/2001 Mei ............................. 360/294.6
6,614,627 B1 * 9/2003 Shimizu et al. ............. 360/294.4

FOREIGN PATENT DOCUMENTS

| JP | 02-227886 | | 9/1990 |
| JP | 11-016311 | | 1/1999 |
| JP | 2001-307442 | | 11/2001 |
| JP | 2002-050140 | A | 2/2002 |
| JP | 2002-093086 | A | 3/2002 |

* cited by examiner

*Primary Examiner* — Craig A. Renner
*Assistant Examiner* — Gustavo Polo
(74) *Attorney, Agent, or Firm* — Sterne, Kessler, Goldstein & Fox P.L.L.C.

(57) ABSTRACT

In a magnetic head suspension according to the present invention, each of paired right and left connecting beams that are positioned on both sides of an open section, with which paired piezoelectric elements are at least partially overlapped in a plan view, in a suspension width direction and connect a proximal end section that is directly or indirectly connected to a main actuator and a distal end section to which the load bending part is connected includes proximal-side and distal-side beams. The distal-side beam is inclined with respect to the proximal-side beam in a plan view such that a connection point between the proximal-side and distal-side beams is located closer to a suspension longitudinal center line relative to a virtual line connecting the proximal end of the proximal-side beam and the distal end of the distal-side beam.

6 Claims, 21 Drawing Sheets

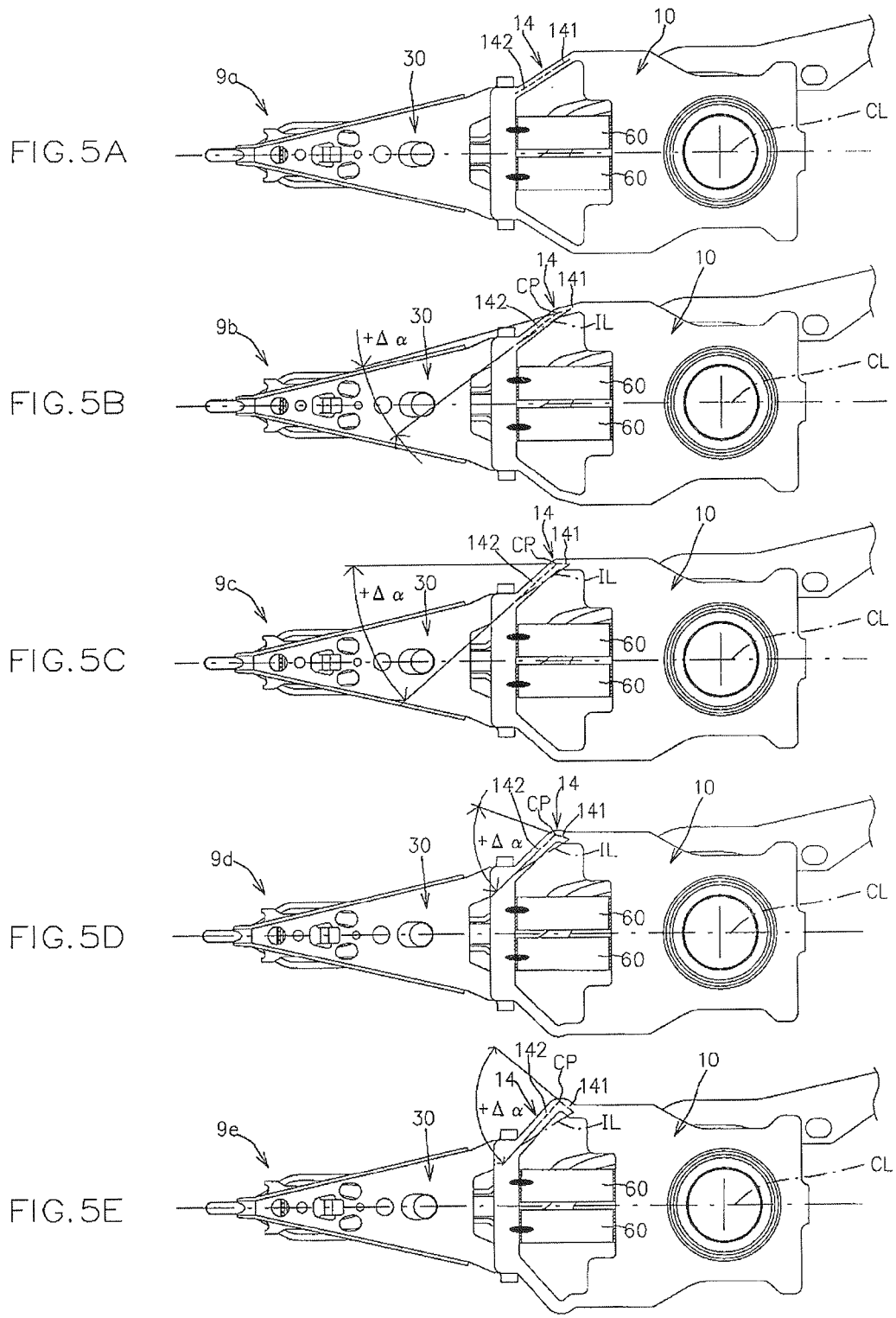

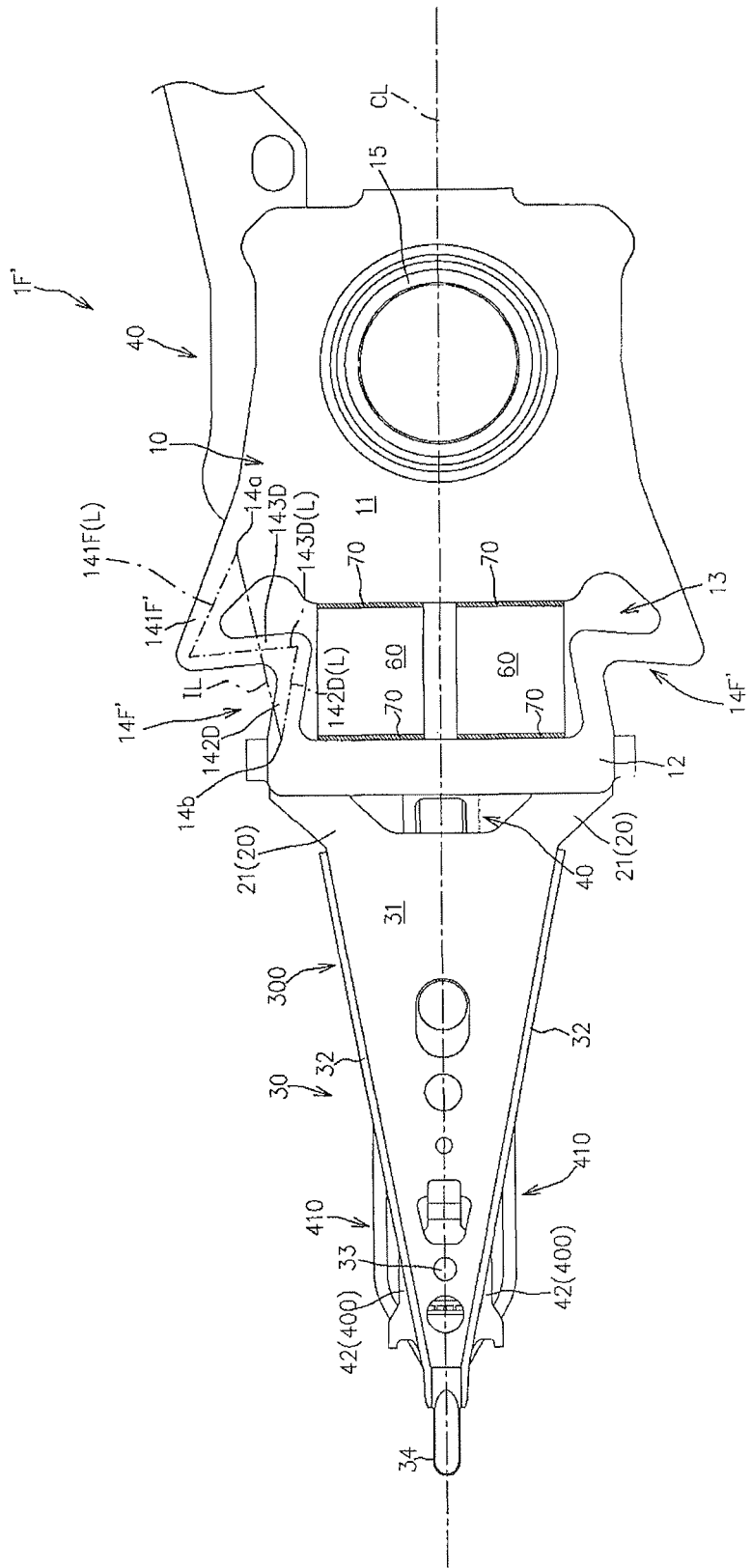

MAGNETIC HEAD SUSPENSION HAVING A SUPPORT PLATE CONNECTED TO THE LOWER SURFACE OF THE SUPPORTING PART

BACKGROUND OF THE INVENTION

1. Field of the Invention

The present invention relates to a magnetic head suspension for supporting a magnetic head slider that reads and/or writes data from and to a recording medium such as a hard disk drive.

2. Related Art

Increase in capacity of a magnetic disk device requires improvement in accuracy for positioning a magnetic head slider on a target track. In this regard, there has been proposed a magnetic head suspension that enables coarse motion of a magnetic head slider in a seek direction by a main actuator such as a voice coil motor as well as micro motion of the magnetic head slider in the seek direction by a piezoelectric element functioning as a sub actuator (for example, see Japanese Unexamined Patent Application Publications No. H02-227886, No. H11-016311, and No. 2001-307442).

The magnetic head suspension including the piezoelectric element as described above needs to be provided with a less rigid region in a supporting part that is swung directly or indirectly by the main actuator such as a voice coil motor in order to realize the micro motion of the magnetic head slider by the piezoelectric element.

More specifically, the magnetic head suspension provided with the piezoelectric element includes a load bending part that generates a load for pressing the magnetic head slider toward a disk surface, a load beam part that transmits the load to the magnetic head slider, the supporting part that supports the load beam part via the load bending part and is swung about a swing center directly or indirectly by the main actuator, a flexure part that is supported by the load beam part and the supporting part while supporting the magnetic head slider, and the piezoelectric element that is attached to the supporting part.

The supporting part is provided with a proximal end region that is connected directly or indirectly to the main actuator, a distal end region to which the load bending part is connected, and the less rigid region that connects the proximal end region and the distal end region with each other. The micro motion of the magnetic head slider is realized by elastic deformation of the less rigid region in response to expansion and contraction motion of the piezoelectric element.

In a case where the rigidity is reduced in the less rigid region, the magnetic head slider can be more easily displaced in the seek direction (in a radial direction in parallel with the disk surface) by the piezoelectric element. On the other hand, such reduction in rigidity of the less rigid region increases a stress applied to the piezoelectric element upon reception of an impact force by a magnetic disk device that is provided with the magnetic head suspension, and also lowers a resonance frequency of the magnetic head suspension.

SUMMARY OF THE INVENTION

The present invention has been achieved in view of the above conventional art, and it is a first object thereof to provide a magnetic head suspension that enables coarse motion of a magnetic head slider by a main actuator as well as micro motion of the magnetic head slider by piezoelectric elements, the magnetic head suspension capable of reducing a stress applied to the piezoelectric elements upon reception of an impact force while raising a resonance frequency thereof.

In order to achieve the first object, the present invention provides a magnetic head suspension including a load bending part that generates a load for pressing a magnetic head slider toward a disk surface, a load beam part that transmits the load to the magnetic head slider, a supporting part that supports the load beam part via the load bending part and is swung about a swing center directly or indirectly by a main actuator, a flexure part that is supported by the load beam part and the supporting part while supporting the magnetic head slider, and paired right and left piezoelectric elements that are attached to the supporting part so as to be symmetrical with each other with respect to a suspension longitudinal center line and have expansion and contraction directions different from each other, in order to enable micro motion of the magnetic head slider in a seek direction, wherein the supporting part includes a proximal end section that is directly or indirectly connected to the main actuator, a distal end section to which the load bending part is connected, an open section that is positioned between the proximal end section and the distal end section in a suspension longitudinal direction, and paired right and left connecting beams that are positioned on both sides of the open section in a suspension width direction and connect the proximal end section and the distal end section, wherein each of the paired piezoelectric elements has proximal and distal ends that are connected to the proximal end section and the distal end section, respectively, while being at least partially overlapped with the open section in a plan view as viewed along a direction perpendicular to the disk surface, wherein each of the paired connecting beams includes a proximal-side beam that linearly extends from a proximal end connected to the proximal end section to a distal end, and a distal-side beam that linearly extends from a proximal end connected to the proximal-side beam to a distal end connected to the distal end section, and wherein the distal-side beam is inclined with respect to the proximal-side beam in a plan view such that a connection point between the proximal-side beam and the distal-side beam is located closer to the suspension longitudinal center line relative to a virtual line connecting the proximal end of the proximal-side beam and the distal end of the distal-side beam.

In the magnetic head suspension according to the present invention, each of the paired piezoelectric elements is mounted to the supporting part so as to have the proximal and distal ends that are connected to the proximal end section and the distal end section of the supporting part, respectively, while being at least partially overlapped with the open section in a plan view, each of the paired connecting beams provided in the supporting part so as to be positioned outside the open section in the suspension width direction and connect the proximal end section and the distal end section includes the proximal-side beam and distal-side beam, and the distal-side beam is inclined with respect to the proximal-side beam in a plan view such that the connection point between the proximal-side beam and the distal-side beam is located closer to the suspension longitudinal center line relative to a virtual line connecting the proximal end of the proximal-side beam and the distal end of the distal-side beam. Accordingly, the magnetic head suspension makes it possible to reduce the stress applied to the piezoelectric elements upon reception of an impact force and, at the same time, raise the resonance frequency of the magnetic head suspension while excellently maintaining easiness of displacement (hereinafter, referred to as micro motion characteristic) of the magnetic head slider in the seek direction by the paired piezoelectric elements.

Preferably, the proximal-side beam is inclined so as to be brought closer to the suspension longitudinal center line as extending from the proximal end to the distal end.

Preferably, the distal-side beam has a width that is gradually increased as extending from the proximal end to the distal end.

In one embodiment, the distal and proximal ends of each of the paired piezoelectric elements are fixed to the distal end section and the proximal end section, respectively, in a state where the piezoelectric element is disposed in the open section such that an end surface on the distal end side and an end surface on the proximal end side of the piezoelectric element are opposed at least partially to a proximal end surface of the distal end section and a distal end surface of the proximal end section, respectively.

In the magnetic head suspension according to the one embodiment, there may be further provided a distal-end-side support plate, which is connected to a lower surface of the supporting part that faces the disk surface and on which lower surfaces, on the distal sides, of the paired piezoelectric elements that face the disk surface are mounted.

The distal-end-side support plate is connected to the lower surface of the supporting part so as to form a gap between a distal edge of the distal-end-side support plate and a proximal edge of the distal end section in a plan view as viewed along a direction perpendicular to the disk surface.

Preferably, the load beam part, the load bending part and the distal-end-side support plate are integrally formed by a single member.

The magnetic head suspension according to the one embodiment may include a proximal-end-side support plate, which is connected to a lower surface of the supporting part that faces the disk surface and on which lower surfaces, on the proximal sides, of the paired piezoelectric elements that face the disk surface are mounted, in addition to/in place of the distal-end-side support plate.

The proximal-end-side support plate is connected to the lower surface of the supporting part so as to form a gap between a proximal edge of the proximal-end-side support plate and a distal edge of the proximal end section in a plan view as viewed along a direction perpendicular to the disk surface.

In the magnetic head suspension with the proximal-end-side support plate, the supporting part may preferably include first and second plate-like members that are overlapped with and fixed to each other.

The first plate-like member may integrally include a region corresponding to the proximal end section, a region corresponding to the paired connecting beams, and a region corresponding to the distal end section.

The second plate-like member may integrally include a region corresponding to the proximal end section, and a region corresponding to the proximal-end-side support plate.

In the various configurations included in the magnetic head suspension according to the one embodiment, an inner surface of each of the distal-side beams that is directed inward in the suspension width direction may be preferably formed to be brought closest to an outer surface of the corresponding piezoelectric element that is directed outward in the suspension width direction at a position of the piezoelectric element that is away by a predetermined distance from its distal end toward its proximal end.

In another one embodiment, the distal and proximal ends of each of the paired piezoelectric elements are mounted on upper surfaces of distal end section and the proximal end section, respectively, in a state where the piezoelectric elements cross over the open section in the suspension longitudinal direction.

In any one of the various configurations, a suspension width central portion of a proximal edge of the distal end section is preferably formed into a concave shape in a plan view so as to be located on the most distal end in the suspension longitudinal direction at its center that is crossed with the suspension longitudinal center line as well as to be brought closer to the proximal end in the suspension longitudinal direction as extending outward both in the suspension width direction from the center.

In any one of the various configurations, a suspension width central portion of a distal edge of the proximal end section is formed into a concave shape in a plan view so as to be located on the most proximal end in the suspension longitudinal direction at its center that is crossed with the suspension longitudinal center line as well as to be brought closer to the distal end in the suspension longitudinal direction as extending outward both in the suspension width direction from the center.

In any one of the various configurations, the supporting part is a base plate including a boss portion to which a distal end of a carriage arm is joined by a swage processing, the carriage arm being connected to the main actuator. Alternatively, the supporting part is an arm that is connected to the main actuator.

The present invention has been achieved in view of the above conventional art, and it is a second object thereof to provide a magnetic head suspension that enables coarse motion of a magnetic head slider by a main actuator as well as micro motion of the magnetic head slider by piezoelectric elements, the magnetic head suspension capable of reducing a stress applied to the piezoelectric elements upon reception of an impact force and raising a resonance frequency thereof while improving micro motion characteristic in the seek direction by the piezoelectric elements.

In order to achieve the second object, the present invention provides a magnetic head suspension including a load bending part that generates a load for pressing a magnetic head slider toward a disk surface, a load beam part that transmits the load to the magnetic head slider, a supporting part that supports the load beam part via the load bending part and is swung about a swing center directly or indirectly by a main actuator, a flexure part that is supported by the load beam part and the supporting part while supporting the magnetic head slider, and paired right and left piezoelectric elements that are attached to the supporting part so as to be symmetrical with each other with respect to a suspension longitudinal center line and have expansion and contraction directions different from each other, in order to enable micro motion of the magnetic head slider in a seek direction, wherein the supporting part includes a proximal end section that is directly or indirectly connected to the main actuator, a distal end section to which the load bending part is connected, an open section that is positioned between the proximal end section and the distal end section in a suspension longitudinal direction, and paired right and left connecting beams that are positioned on both sides of the open section in a suspension width direction and connect the proximal end section and the distal end section, wherein each of the paired piezoelectric elements has proximal and distal ends that are connected to the proximal end section and the distal end section, respectively, while being at least partially overlapped with the open section in a plan view as viewed along a direction perpendicular to the disk surface, wherein the distal end section has a length in the suspension width direction shorter than that of a distal end of the proximal end section, so that a virtual line connecting a center point of a proximal end, which is connected to the proximal end section, of each of the connecting beams and a center point of a distal end, which is connected to the distal end section, of the connecting beam is brought closer to the suspension longitudinal center line as it extends toward the distal end in the suspension longitudinal direction, wherein each of the paired connecting beams includes a proximal-side beam that extends from the proximal end connected to the proximal end section toward the distal side in the suspension longitudinal direction, a distal-side beam that extends from the distal end connected to the distal end section toward the proximal side in the suspension longitudinal direction, and an intermediate beam connecting a distal end of the proximal-side beam and a proximal end of the distal-side beam, and wherein each of the connecting beams is bent at a connection point between the proximal-side beam and the intermediate beam as well as at a connection point between the distal-side beam and the intermediate beam, so that an intermediate beam longitudinal line connecting center points of proximal and distal ends of the intermediate beam is across the virtual line.

In the magnetic head suspension according to the present invention, the distal end section of the supporting part has a length in the suspension width direction shorter than that of a distal end of the proximal end section so that a virtual line connecting a center point of a proximal end, which is connected to the proximal end section, of each of the connecting beams and a center point of a distal end, which is connected to the distal end section, of the connecting beam is brought closer to the suspension longitudinal center line as it extends toward the distal end in the suspension longitudinal direction. Accordingly, it is possible to reduce the moment of inertia of the sub actuator around the rotational center, thereby raising the resonance frequency in the main resonance mode. Further, the configuration makes it possible to reduce the weight of the distal side of the supporting part, thereby raising the resonance frequency in the bending mode in the z direction perpendicular to the disk surface. As a result, reduced is the stress applied to the piezoelectric elements upon reception of an impact force, thereby improving the impact resistance of the magnetic head suspension.

Furthermore, in magnetic head suspension according to the present invention, each of the connecting beams is bent at a connection point between the proximal-side beam and the intermediate beam as well as at a connection point between the distal-side beam and the intermediate beam, so that an intermediate beam longitudinal line connecting center points of proximal and distal ends of the intermediate beam is across the virtual line. Accordingly, it is possible to set the bend angles of the bent portions of each of the connecting beams within a desired range that allows the elastic deformation of the connecting beam, without significantly extending the connecting beam outward in the suspension width direction. Therefore, prevented as much as possible is deterioration in rigidity in the z direction perpendicular to the disk surface, and improved is the micro motion characteristic of the magnetic head slider by the piezoelectric elements (namely, the degree of easiness for displacement of the magnetic head slider by the piezoelectric elements in the seek direction in parallel with the disk surface).

Preferably, the connection point between the proximal-side beam and the intermediate beam is located outside the virtual line in the suspension width direction, and the connection point between the distal-side beam and the intermediate beam is located inside the virtual line in the suspension width direction.

In one embodiment, the paired piezoelectric elements are disposed so as to expand and contract along the suspension longitudinal line, a distal-side beam longitudinal line that connects center points of the proximal and distal ends of the distal-side beam is farther away from the suspension longitudinal center line as it extends toward the distal side in the suspension longitudinal direction, and a proximal-side beam longitudinal line that connects center points of the proximal and distal ends of the proximal-side beam is brought closer to the suspension longitudinal center line as it extends in the distal side in the suspension longitudinal direction.

In another one embodiment, the paired piezoelectric elements are disposed so as to expand and contract along the suspension longitudinal line, a distal-side beam longitudinal line that connects center points of the proximal and distal ends of the distal-side beam is farther away from the suspension longitudinal center line as it extends toward the distal side in the suspension longitudinal direction, and a proximal-side beam longitudinal line that connects center points of the proximal and distal ends of the proximal-side beam is farther away from the suspension longitudinal center line as it extends in the distal side in the suspension longitudinal direction.

In any one of the above configurations, the proximal-side beam may preferably have a width that becomes narrower as it extends from the proximal side to the distal side in the suspension longitudinal direction.

BRIEF DESCRIPTION OF THE DRAWINGS

FIGS. 5A to 5E are top views of magnetic head suspensions according to first to fifth comparative examples, respectively.

FIGS. 8A to 8E show relationships of resonance frequencies in the main resonance mode, the first bending mode, the first torsion mode, the second torsion mode, and the third torsion mode with respect to the inclined angle, respectively.

FIG. 20 is a top view of a magnetic head suspension according to a modification of the sixth embodiment.

DETAILED DESCRIPTION OF THE PREFERRED EMBODIMENTS

First Embodiment

Hereinafter, one preferred embodiment of a magnetic head suspension according to the present invention will be described, with reference to the attached drawings.

Figure 1A:
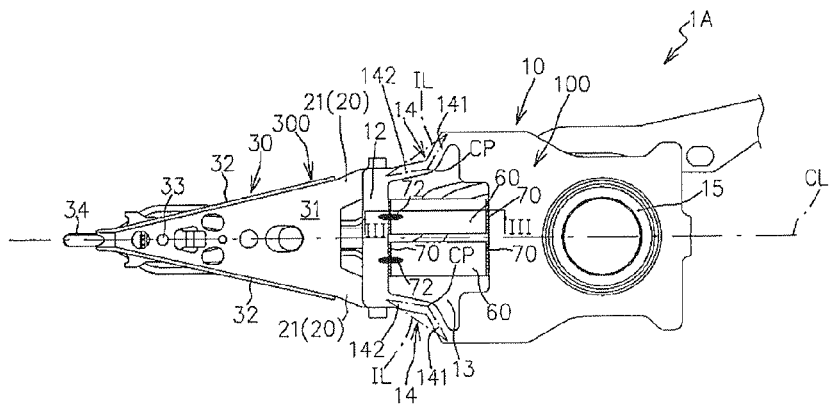
FIGS. 1A to 1C are a top view, a bottom view and a side view of a magnetic head suspension according to a first embodiment of the present invention, respectively.
Figure 1B:
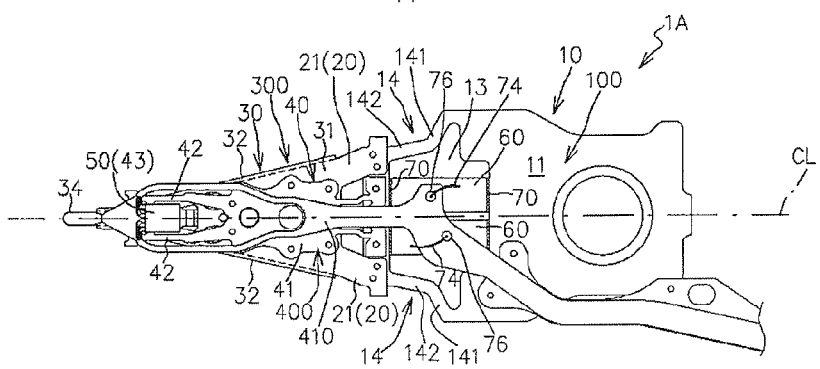
Figure 1C:
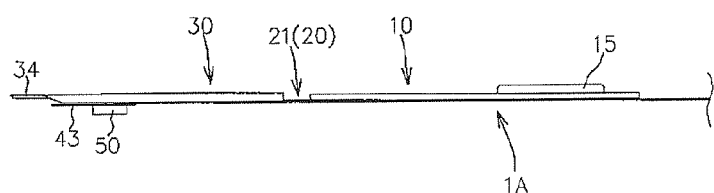

FIGS. 1A to 1C are a top view (a plan view as viewed from a side opposite from a disk surface), a bottom view (a bottom plan view as viewed from a side close to the disk surface) and a side view of a magnetic head suspension 1A according to the present embodiment, respectively. FIG. 1B indicates welding points with using small circles.

As shown in FIGS. 1A to 1C, the magnetic head suspension 1A includes a load bending part 20 that generates a load for pressing a magnetic head slider 50 toward a disk surface, a load beam part 30 that transmits the load to the magnetic head slider 50, a supporting part 10 that supports the load beam part 30 via the load bending part 20 and is swung about a swing center directly or indirectly by a main actuator, a flexure part 40 that is supported by the load beam part 30 and the supporting part 10 while supporting the magnetic head slider 50, and paired right and left piezoelectric elements 60 that are attached to the supporting part 10 so as to be symmetrical with each other with respect to a suspension longitudinal center line CL and have expansion and contraction directions different from each other, in order to enable micro motion of the magnetic head slider 50 in a seek direction.

The supporting part 10 is a member for supporting the load beam part 30 through the load bending part 20 while being directly or indirectly connected to the main actuator such as a voice coil motor, and is therefore made to have relatively high rigidity.

In the present embodiment, the supporting part 10 is formed as a base plate including a boss portion 15 to which a distal end of a carriage arm (not shown) is joined by a swage processing, the carriage arm being connected to the main actuator.

The supporting part 10 may be preferably made from, for example, a stainless plate having a thickness of 0.1 mm to 0.8 mm.

Figure 2:
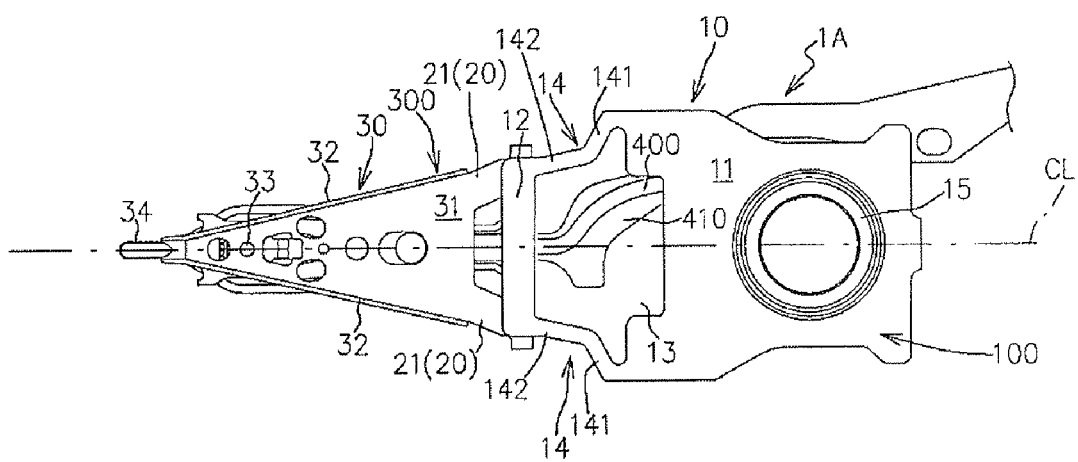
FIG. 2 is a top view of the magnetic head suspension shown in FIG. 1 in a state where paired piezoelectric elements are removed.

FIG. 2 is a top view of the magnetic head suspension 1A in a state where the paired piezoelectric elements 60 are removed.

As shown in FIGS. 1A to 1C and 2, the supporting part 10 includes a proximal end section 11 that is directly or indirectly connected to the main actuator, a distal end section 12 to which the load bending part 20 is connected, an open section 13 that is positioned between the proximal end section 11 and the distal end section 12 in a suspension longitudinal direction, and paired right and left connecting beams 14 that are positioned on both sides of the open section 13 in a suspension width direction and connect the proximal end section 11 and the distal end section 12.

Detailed configuration of the paired connecting beams 14 will be later explained.

As described above, the load beam part 30 is a member for transmitting the load generated by the load bending part 20 to the magnetic head slider 50, and therefore is required to have a predetermined rigidity.

As shown in FIG. 1A to FIG. 1C and FIG. 2, in the present embodiment, the load beam part 30 has a plate-like main body portion 31 and flange portions 32 that are formed by being bent in a direction away from the disk surface at both sides of the main body portion 31 in the suspension width direction, and secures the rigidity by the flange portions 32.

The load beam part 30 may be made from, for example, a stainless plate having a thickness of 0.02 mm to 0.1 mm.

Specifically, the load beam part 30 is provided, at its distal end section, with a protrusion 33 that is so-called dimple.

The protrusion 33 is protruded by, for example, about 0.05 mm to 0.1 mm, in a direction toward the disk surface. The protrusion 33 is brought into contact with an upper surface (a surface opposite from the disk surface) of a head-mounting region 43 of the flexure part 40, so that the load is transmitted to the head-mounting region 43 of the flexure part 40 through the protrusion 33.

In the present embodiment, the load beam part 30 further integrally includes a lift tab 34 that extends from a distal end of the main body portion 31 toward a distal end side in the suspension longitudinal direction. The lift tab 34 is a member that engages with a lamp provided in a magnetic disk device so as to cause the magnetic head suspension 50 to be away from the disk surface in z direction (a direction perpendicular to the disk surface) at the time when the magnetic head suspension 1A is swung by the main actuator so that the magnetic head slider 50 is positioned outward the disk surface in a radial direction.

The load bending part 20 has a proximal end connected to the supporting part 10 and a distal end connected to the load beam part 30, and generates the load for pressing the magnetic head suspension 50 toward the disk surface in accordance with its elastic deformation.

As shown in FIGS. 1A to 1C and FIG. 2, in the present embodiment, the load bending part 20 includes paired right and left leaf springs 21 that are disposed so that their plate surfaces face the disk surface.

Preferably, the paired leaf springs 21 are elastically bended in such a direction as to cause the magnetic head suspension 50 to be come close to the disk surface before the magnetic head suspension 1A is mounted to the magnetic disk device, and is mounted to the magnetic disk device in a state where the paired leaf springs are elastically bended back so as to generate the pressing load.

The load bending part 20 is made from a stainless steel plate of 0.02 mm to 0.1 mm thick, for example.

In the present embodiment, as shown in FIGS. 1A to 1C and FIG. 2, the load bending part 20 is integrally formed with the load beam part 30.

More specifically, the magnetic head suspension 1A according to the present embodiment includes a load beam part component 300 that integrally form the load beam part 30 and the load bending part 20. The load beam part component 300 is welded to the supporting part 10 in a state where an upper surface of the load beam part component 300 that is poisoned on a side opposite from the disk surface is brought into contact with a lower surface, which faces the disk surface, of the distal end section 12 of the supporting part 10.

The flexure part 40 is fixed to the load beam part 30 and the supporting part 10 while supporting the magnetic head slider 50.

Specifically, the flexure part 40 includes, as shown in FIG. 1B, a body region 41 that is fixed to a surface of the load beam part 30 that faces the disk surface by welding or the like, paired supporting pieces 42 that extends from the body region 41 toward the distal end side, and the head-mounting region 43 that is supported by the supporting pieces 42.

The head-mounting region 43 supports the magnetic head slider 50 at a lower surface that faces the disk surface.

As described above, the protrusion 33 is brought into contact with the upper surface of the head-mounting region 43, so that the head-mounting region 43 could sway flexibly in a roll direction and in a pitch direction, with the protrusion 33 functioning as a fulcrum.

The flexure part 40 has rigidity lower than that of the load beam part 30, so that the head-mounting region 43 could sway in the roll direction and in the pitch direction.

The flexure part 40 may be preferably made from, for example, a stainless plate having a thickness of 0.01 mm to 0.025 mm.

In the present embodiment, the flexure part 40 is provided integrally with a wiring that is in the form of a printed circuit and transmits a writing signal and/or a reading signal to/from the magnetic head slider 50.

That is, the flexure part 40 has a flexure base plate 400 integrally including the body region 41, the supporting pieces 42 and the head-mounting region 43, and a flexure wiring structure 410 laminated on the flexure base plate 400.

Although the flexure wiring structure 410 is not shown in the figures, it may include an insulating layer laminated on a lower surface of the flexure base plate 400 that faces the disk surface, a conductor layer laminated on a lower surface of the insulating layer that faces the disk surface, and a cover layer enclosing the conductor layer.

In the present embodiment, as shown in FIG. 1B, the flexure base plate 400 is fixed by welding to the main body portion 31 of the load beam part 30, and the distal end section 12 and the proximal end section 11 of the supporting part 10.

Each of the piezoelectric elements 60 has a main body made of PZT (lead zirconate titanate) and paired electrode layers disposed on both ends of the main body in the thickness direction thereof.

The main body is 0.05 mm to 0.3 mm thick, for example, and the electrode layers are each made of Ag or Au so as to have a thickness from 0.05 μm to several μm.

As shown in FIG. 1A, each of the paired piezoelectric elements 60 has a proximal end connected to the proximal end section 11 and a distal end connected to the distal end section 12 in a state of being at least partially overlapped with the open section 13 in a plan view as viewed along a direction perpendicular to the disk surface. Further, the paired piezoelectric elements 60 are arranged in such a manner as that one of them expands and the other one of them contracts in accordance with application of a voltage so that the piezoelectric elements 60 function as a sub actuator for causing the magnetic head slider 50 to perform micro motion in the seek direction.

Figure 3:
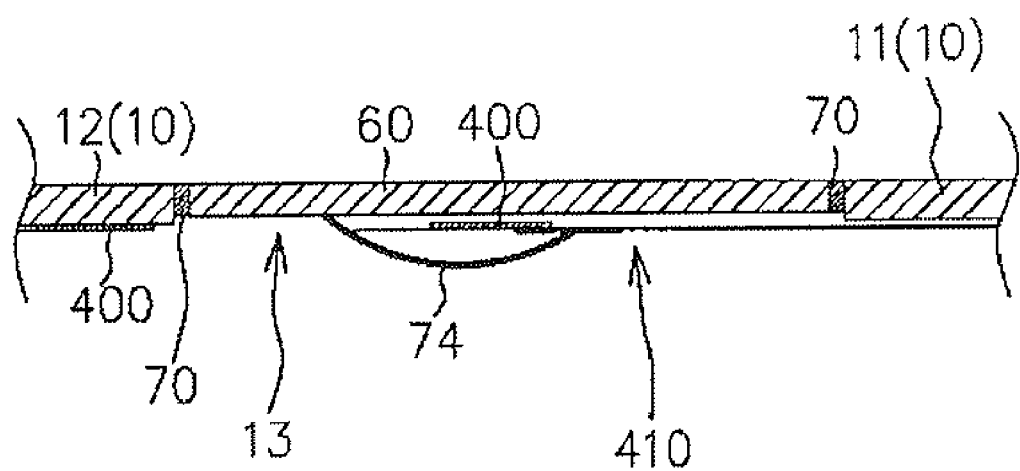
FIG. 3 is a cross sectional view taken along line III-III in FIG. 1A.
Figure 4A:
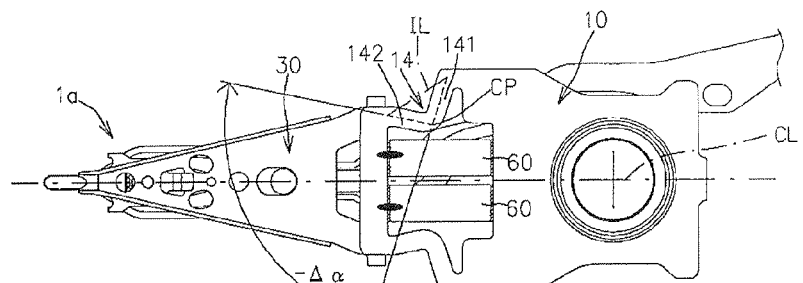
FIGS. 4A to 4E are top views of magnetic head suspensions according to first to fifth examples included in the first embodiment, respectively.
Figure 4B:
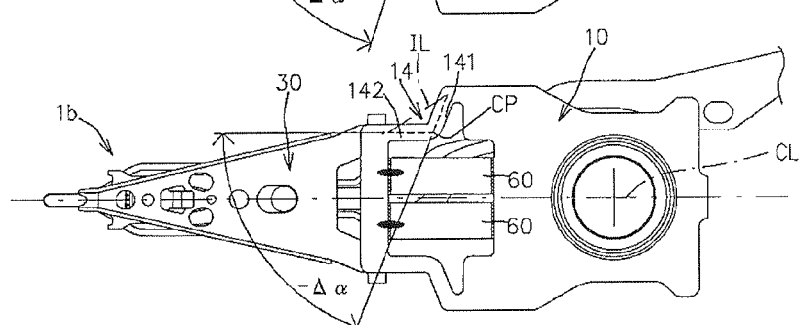
Figure 4C:
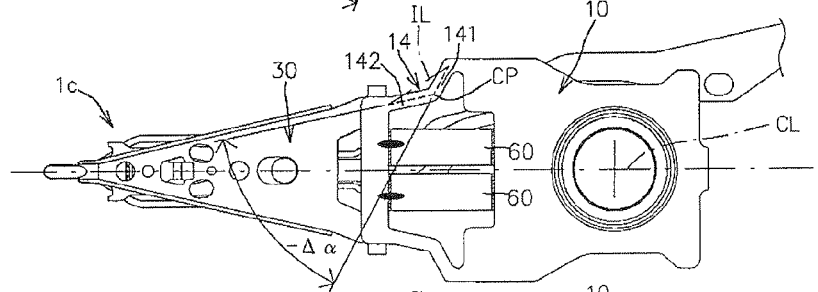
Figure 4D:
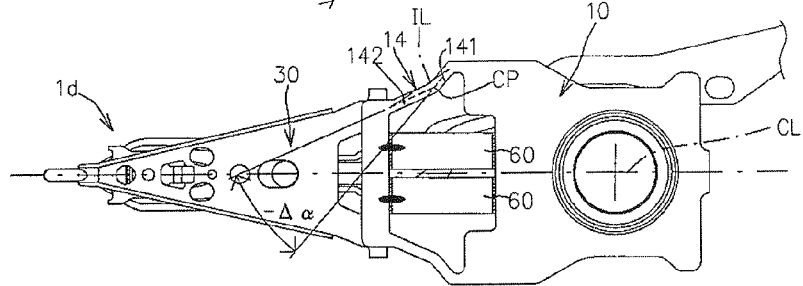
Figure 4E:
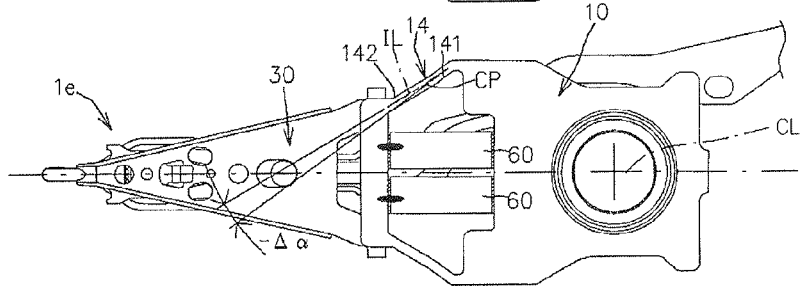

FIG. 3 is a cross sectional view taken along line III-III in FIG. 1A.

In the present embodiment, as shown in FIGS. 1A, 1B and 2, the paired piezoelectric elements 60 are wholly disposed within the open section 13 in a plan view as viewed along the direction perpendicular to the disk surface.

More specifically, the distal ends and the proximal ends of the paired piezoelectric elements 60 are fixed to the distal end section 12 and the proximal end section 11, respectively, in a state where the paired piezoelectric elements 60 are disposed in the open section 13 such that end surfaces on the distal end sides and end surfaces on the proximal end sides of the paired piezoelectric elements 60 are opposed at least partially to a proximal end surface of the distal end section 12 and a distal end surface of the proximal end section 11, respectively.

According to the configuration, the expansion and contraction motion of the paired piezoelectric elements 60 can be transmitted as much as possible as displacement of the magnetic head slider 50 in the seek direction.

Moreover, according to the above configuration, the paired piezoelectric elements 60 can be overlapped partially or entirely with the supporting part 10 in the thickness direction. Therefore, it is possible to reduce as much as possible the thickness of the entire magnetic head suspension 1A inclusive of the paired piezoelectric elements 60.

In the present embodiment, the paired piezoelectric elements 60 have the end surfaces on the distal end side that are fixed to the proximal end surfaces of the distal end section 12 by a fixing member 70 such as an insulative adhesive agent and the end surfaces on the proximal end side that are fixed to the distal end surface of the proximal end section 11 by the fixing member 70 such as the insulative adhesive agent in a state where the paired piezoelectric elements 60 are wholly arranged in the open section 13 in a plan view.

That is, the expansion and contraction motion of the paired piezoelectric elements 60 is transmitted to the distal end section 12 and the proximal end section 11 via the fixing members 70.

As shown in FIGS. 1A to 1C, in the present embodiment, the paired piezoelectric elements 60 are disposed such that longitudinal directions (in other words, the expansion and contraction directions) thereof are aligned along the suspension longitudinal direction. However, the present invention is not limited to such a configuration.

More specifically, the longitudinal directions of the paired piezoelectric elements 60 may be inclined with respect to the suspension longitudinal direction as long as the paired piezoelectric elements 60 are disposed symmetrically with each other with respect to the suspension longitudinal center line CL and each of the longitudinal directions of the paired piezoelectric elements 60 has an element along the suspension longitudinal direction.

Application of a voltage to the paired piezoelectric elements 60 can be made with use of the flexure wiring structure 410, for example.

In the present embodiment, in a state where the upper one (not facing the disk surface) of the electrode layer of each of the paired piezoelectric elements 60 is electrically connected to the supporting part 10 via a conductive member 72 (see FIG. 1A) such as a conductive adhesive agent so as to have a ground potential, a voltage is applied to the lower one (facing the disk surface) of the electrode layers of each of the paired piezoelectric elements 60 with use of the flexure wiring structure 410.

Preferably, as shown in FIGS. 1B and 2, the flexure part 40 is arranged so as to be partially overlapped with the paired piezoelectric elements 60 in a plan view as viewed along the direction perpendicular to the disk surface. The configuration makes it possible to easily apply voltage to lower electrodes of the paired piezoelectric elements 60 using the flexure wiring structure 410.

In the present embodiment, as shown in FIGS. 1B and 3, the conductor layer of the flexure wiring structure are electrically connected to the lower electrodes of the paired piezoelectric elements 60 by wire bonding.

FIG. 1B also shows an opening 76 formed at the cover layer for exposing the conductor layer.

The configuration of the paired connecting beams 14 is now explained.

The paired connecting beams 14 are symmetrical to each other with respect to the suspension longitudinal center line CL.

As shown in FIGS. 1A, 1B and 2, each of the paired connecting beams 14 includes a proximal-side beam 141 that linearly extends from a proximal end connected to the proximal end section 11 to a distal end, and a distal-side beam 142 that linearly extends from a proximal end connected to the proximal-side beam 141 to a distal end connected to the distal end section 12.

As shown in FIG. 1A, the longitudinal direction of the distal-side beam 142 is inclined with respect to the longitudinal direction of the proximal-side beam 141 in a plan view such that a connection point CP between the proximal-side beam 141 and the distal-side beam 142 (a cross point of the longitudinal center line of the proximal-side beam 141 and the longitudinal center line of the distal-side beam 142) is located closer to the suspension longitudinal center line CL relative to a virtual line IL connecting the proximal end of the proximal-side beam 141 and the distal end of the distal-side beam 142 (a virtual line connecting the width center point of the proximal end of the proximal-side beam 141 and the width center point of the distal end of the distal-side beam 142).

In other words, each of the connecting beams 14 is bent at the connection point CP between the proximal-side beam 141 and the distal-side beam 142 such that the connection point CP is located closer to the suspension longitudinal center line CL relative to the virtual line IL.

The magnetic head suspension 1A thus configured is capable of excellently maintaining the micro motion characteristic of the magnetic head slider 50 in the seek direction by the paired piezoelectric elements 60, as well as is capable of reducing the stress applied to the piezoelectric elements 60 upon reception of an impact force and raising the resonance frequency of the magnetic head suspension 1A.

In the present embodiment, the distal end section 12, the paired connecting beams 14 and the proximal end section 11 are integrally formed by a single member.

Specifically, a supporting part component 100 forming the supporting part 10 integrally includes a region forming the distal end section 12, a region forming the paired connecting beams 14, and a region forming a proximal end section 11.

The supporting part component 100 may be made from, for example, a plate-like base plate by pressing work.

Described below is a result of analysis on the magnetic head suspension 1A for verification of the advantage thereof in accordance with the finite element method.

FIGS. 4A to 4E and 5A to 5E are top views of magnetic head suspensions used in this analysis.

FIGS. 4A to 4E show magnetic head suspensions 1a to 1e according to first to fifth examples in which the longitudinal direction of the distal-side beam 142 is inclined with respect to the longitudinal direction of the proximal-side beam 141 in a plan view such that the connection point CP between the proximal-side beam 141 and the distal-side beam 142 is located closer to the suspension longitudinal center line CL relative to the virtual line IL.

On the other hand, FIG. 5A shows a magnetic head suspension 9a according to a first comparative example in which the longitudinal direction of the distal-side beam 142 is located coaxially with the longitudinal direction of the proximal-side beam 141 in a plan view, and FIGS. 5B to 5E show magnetic head suspensions 9b to 9e according to second to fifth comparative examples in which the longitudinal direction of the distal-side beam 142 is inclined with respect to the longitudinal direction of the proximal-side beam 141 in a plan view such that the connection point CP between the proximal-side beam 141 and the distal-side beam 142 is located farther away from the suspension longitudinal center line CL relative to the virtual line IL.

In the magnetic head suspensions 1a to 1e according to the first to fifth examples, inclination angles $\Delta\alpha$ of the longitudinal direction of the distal-side beam 142 with respect to the longitudinal direction of the proximal-side beam 141 are set to $-84.5°$, $-68.4°$, $-50.1°$, $-25.8°$, and $-5.4°$, respectively.

On the other hand, in the magnetic head suspensions 9a to 9e according to the first to fifth comparative examples, the inclination angles $\Delta\alpha$ are set to $0°$, $+21.8°$, $+41.7°$, $+63.7°$, and $+88.0°$, respectively.

With regard to indications of the inclination angles $\Delta\alpha$, in a case where the inclination angle $\Delta\alpha$ has a − (minus) value, the longitudinal direction of the distal-side beam 142 is inclined with respect to the longitudinal direction of the proximal-side beam 141 such that the connection point CP between the proximal-side beam 141 and the distal-side beam 142 is located closer to the suspension longitudinal center line CL relative to the virtual line IL. On the other hand, in a case where the inclination angle $\Delta\alpha$ has a + (plus) value, the longitudinal direction of the distal-side beam 142 is inclined with respect to the longitudinal direction of the proximal-side beam 141 such that the connection point CP between the proximal-side beam 141 and the distal-side beam 142 is located farther away from the suspension longitudinal center line CL relative to the virtual line IL.

Further, in this analysis, the position of the connection point CP in the suspension longitudinal direction was determined such that, when L denotes the distance in the suspension longitudinal direction from the proximal end of the proximal-side beam 141 to the distal end of the distal-side beam 142, the distance in the suspension longitudinal direction from the connection point CP to the proximal end of the proximal-side beam 141 is expressed as $\frac{1}{4} \times L$.

In this analysis, the thicknesses of the load beam part 30, the piezoelectric element 60, the supporting part 10, the flexure board 400, and the flexure wiring structure 410 were set to 0.025 mm, 0.12 mm, 0.15 mm, 0.018 mm, and 0.018 mm, respectively.

Firstly obtained was a necessary width of the connecting beam 14 in each of the magnetic head suspensions 1a to 1e according to the first to fifth examples and the magnetic head suspensions 9a to 9e according to the first to fifth comparative examples in order to equalize the micro motion characteristics by the paired piezoelectric elements 60 in all of these magnetic head suspensions.

More specifically, in each of the magnetic head suspensions 1a to 1e according to the first to fifth examples and the magnetic head suspensions 9a to 9e according to the first to fifth comparative examples, there was obtained the width of each of the paired connecting beams 14 required to set a displacement characteristic of the magnetic head slider 50 in the seek direction in response to the voltage applied to the paired piezoelectric elements 60 to 8.6 nm/V.

Figure 6:
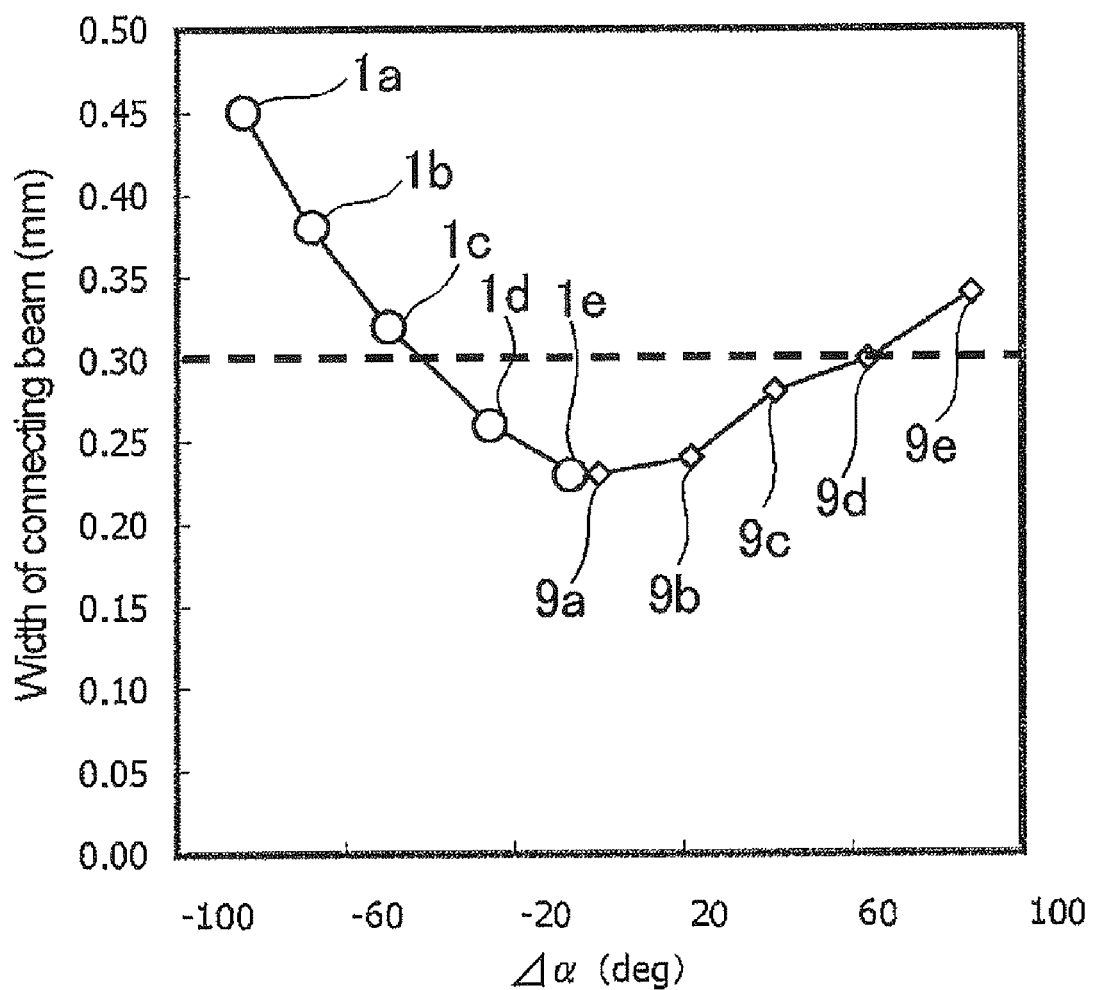
FIG. 6 is a graph showing a result of analysis performed in accordance with the finite element method with respect to each of the magnetic head suspensions according to the first to fifth examples and the first to fifth comparative examples that have different inclined angles between the proximal-side beam and the distal-side beam of the connecting beam one another, and shows a width of the connecting beam that is required to realize a predetermined micro motion characteristic (8.6 nm/V) in each of the first to fifth examples and the first to fifth comparative examples.

FIG. 6 shows a result of the analysis.

The width 0.30 mm of the connecting beam 14 indicated by a dashed line in FIG. 6 is the minimum value required to stably form the supporting part 10 inclusive of the paired connecting beams 14 by pressing work.

More specifically, the width of a beam part needs to be at least twice the thickness of a plate in order to stably form a member that has a shape including the beam part by pressing work.

As described above, the paired connecting beams 14 are provided at the supporting part 10. In this analysis, the thickness of the supporting part 10 inclusive of the paired connecting beams 14 is set to 0.15 mm.

Accordingly, in order to stably form, by pressing work, the supporting part 10 inclusive of the paired connecting beams 14 under the condition for this analysis, each of the paired connecting beams 14 is required to have the width of at least 0.30 mm.

As apparent from FIG. 6, in the magnetic head suspension 9a according to the first comparative example in which the inclination angle $\Delta\alpha$ is set to zero (that is, the connecting beam 14 has a linear shape in a plan view), the connecting beam 14 is required to have the minimum width in order to have the above displacement characteristic. To the contrary, in a case where the value of the inclination angle $\Delta\alpha$ is increased from zero into any one of − and + directions, the width of the connecting beam 14 can be increased while realizing the displacement characteristic.

More specifically, in comparison to the configuration in which each of the paired connecting beams 14 is formed into the linear shape, the configuration in which each of the paired connecting beams 14 is bent at the connection point CP can have the increased width of each of the connecting beams 14 while realizing the same micro motion characteristic.

Therefore, the configuration in which each of the paired connecting beams 14 is bent at the connection point CP is recognized as having improved pressing performance while having the same micro motion characteristic in comparison to the configuration in which each of the paired connecting beams 14 is formed into the linear shape.

Also, as apparent from FIG. 6, the inclination angle $\Delta\alpha$ needs to be set to at least 62° in order to set the width of each of the paired connecting beams 14 to at least 0.30 mm in the configuration in which the longitudinal direction of the distal-side beam 142 is inclined with respect to the longitudinal direction of the proximal-side beam 141 in a plan view such that the connection point CP is located farther away from the suspension longitudinal center line CL relative to the virtual line IL (namely, the configuration with the inclination angle $\Delta\alpha>0$).

To the contrary, in the configuration in which the longitudinal direction of the distal-side beam 142 is inclined with respect to the longitudinal direction of the proximal-side beam 141 in a plan view such that the connection point CP is located closer to the suspension longitudinal center line CL relative to the virtual line IL (namely, the configuration with the inclination angle $\Delta\alpha<0$), the width of each of the paired connecting beams 14 can be set to at least 0.30 mm by setting the inclination angle $\Delta\alpha$ to at most −42°.

That is, the configuration, in which the longitudinal direction of the distal-side beam 142 is inclined with respect to the longitudinal direction of the proximal-side beam 141 in a plan view such that the connection point CP is located closer to the suspension longitudinal center line CL relative to the virtual line IL, realizes a desired micro motion characteristic with a smaller inclination angle of the distal-side beam 142 with respect to the proximal-side beam 141, in comparison to the configuration in which the longitudinal direction of the distal-side beam 142 is inclined with respect to the longitudinal direction of the proximal-side beam 141 in a plan view such that the connection point CP is located farther away from the suspension longitudinal center line CL relative to the virtual line IL.

According to the above, the magnetic head suspension 1A according to the present embodiment is recognized as being capable of improving the micro motion characteristic in comparison to a magnetic head suspension in which the longitudinal direction of the distal-side beam 142 is inclined with respect to the longitudinal direction of the proximal-side beam 141 in a plan view such that the connection point CP is located farther away from the suspension longitudinal center line CL relative to the virtual line IL.

Moreover, the configuration, in which the longitudinal direction of the distal-side beam 142 is inclined with respect to the longitudinal direction of the proximal-side beam 141 in a plan view such that the connection point CP is located closer to the suspension longitudinal center line CL relative to the virtual line IL, realizes reduction in size in the suspension width direction in comparison to the configuration in which the longitudinal direction of the distal-side beam 142 is inclined with respect to the longitudinal direction of the proximal-side beam 141 in a plan view such that the connection point CP is located farther away from the suspension longitudinal center line CL relative to the virtual line IL.

Subsequently described is a result of analysis on impact resistance of each of the magnetic head suspensions 1a to 1e according to the first to fifth examples and the magnetic head suspensions 9a to 9e according to the first to fifth comparative examples.

In this analysis, regarding each of the magnetic head suspensions 1a to 1e according to the first to fifth examples and the magnetic head suspensions 9a to 9e according to the first to fifth comparative examples, in a state where the boss portion 15 is restrained and the magnetic head slider 50 is also restrained so as not to be displaced in a z direction perpendicular to a disk surface, applied to these restrained regions was a shock wave (sine half wave) having a pulse width of 1.0 msec and a peak value of 1000 G in a direction toward the disk surface, and obtained was the maximum stress caused to the paired piezoelectric elements 60.

Figure 7:
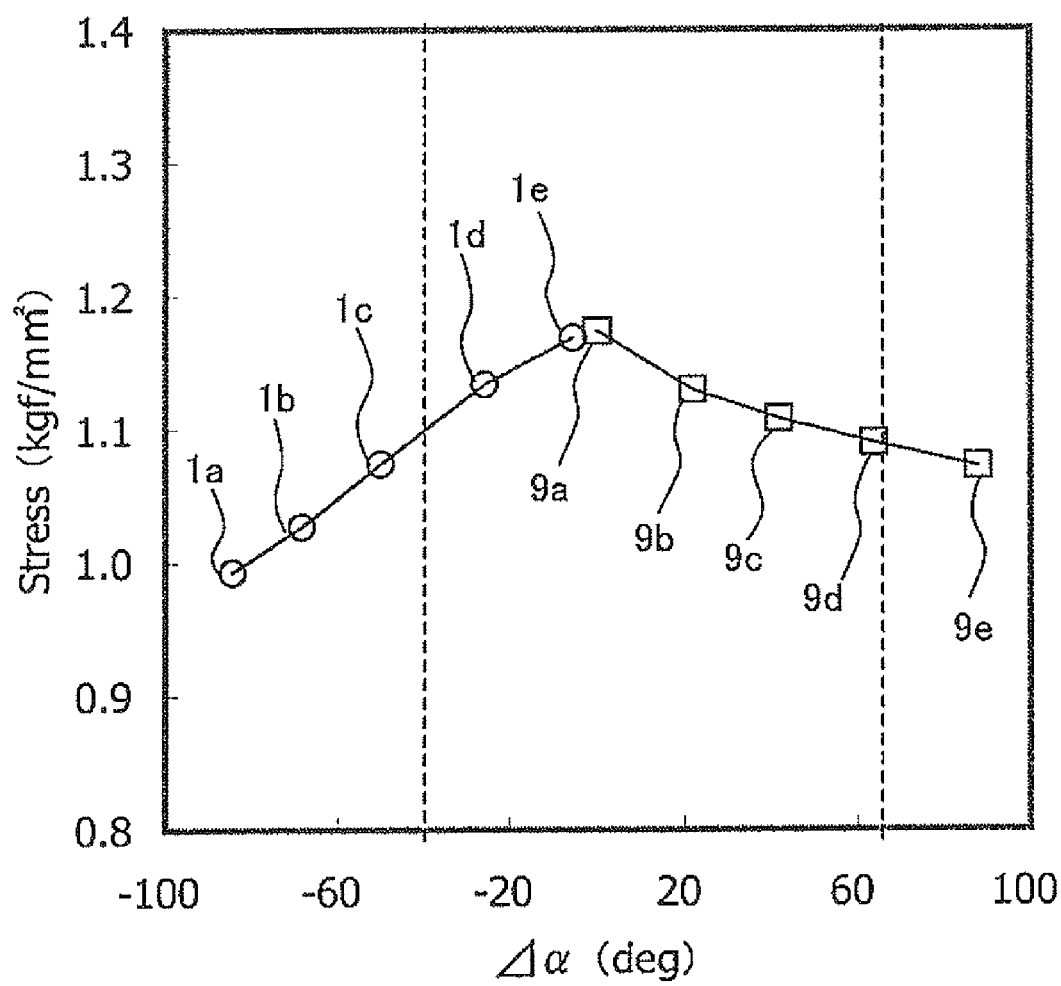
FIG. 7 is a graph showing a result of analysis performed in accordance with the finite element method for impact resistance with respect to each of the magnetic head suspensions according to the first to fifth examples and the first to fifth comparative examples, and shows a relationship between the inclined angle and a stress applied to the piezoelectric element upon reception of a predetermined impact force in each of the examples.

FIG. 7 shows the result of this analysis.

As apparent from FIG. 7, the maximum stress is applied to the paired piezoelectric elements 60 in a case of the inclination angle $\Delta\alpha=0$ (in the case where each of the paired connecting beams 14 has the linear shape in a plan view), and the stress applied to the paired piezoelectric elements 60 is reduced as the inclination angle $\Delta\alpha$ is increased gradually into any one of the + and − directions.

Accordingly, the configuration in which each of the paired connecting beams 14 is bent at the connection point CP is recognized as improving the impact resistance in comparison to the configuration in which each of the paired connecting beams 14 is formed into the linear shape.

Also, as apparent from FIG. 7, the case where the inclination angle Δα is increased into the − direction could realize reduction of the stress applied to the paired piezoelectric elements 60 larger than the case where the inclination angle Δα is increased into the + direction.

From this fact, the magnetic head suspension 1A according to the present embodiment is recognized as improving the impact resistance in comparison to a magnetic head suspension in which the longitudinal direction of the distal-side beam 142 is inclined with respect to the longitudinal direction of the proximal-side beam 141 in a plan view such that the connection point CP is located farther away from the suspension longitudinal center line CL relative to the virtual line IL.

Lastly described is a result of analysis on the resonance frequencies of the magnetic head suspensions 1a to 1e according to the first to fifth examples and the magnetic head suspensions 9a to 9e according to the first to fifth comparative examples.

In this analysis, obtained in accordance with the eigenvalue analysis were the resonance frequencies in the main resonance mode, the first bending mode, the first torsion mode, the second torsion mode, and the third torsion mode of each of the magnetic head suspensions 1a to 1e according to the first to fifth examples and the magnetic head suspensions 9a to 9e according to the first to fifth comparative examples.

FIGS. 8A to 8E respectively show the result of this analysis.

The main resonance mode is a vibration mode of the magnetic head suspension in the seek direction. The first bending mode is a vibration mode of bending motion of the magnetic head suspension in the z direction (perpendicular to the disk surface). The first torsion mode is a vibration mode of torsion motion of the load bending part about the suspension longitudinal center line. The second torsion mode is a vibration mode of torsion motion of the supporting part about the suspension longitudinal center line. The third torsion mode is a vibration mode of torsion motion of the load beam part about the suspension longitudinal center line.

Figure 8A:
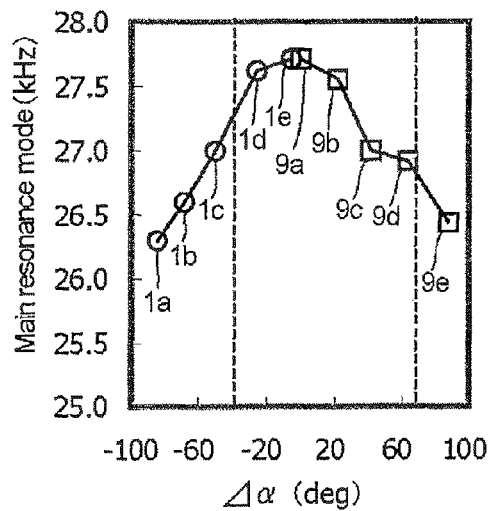
FIGS. 8A to 8E are graphs showing results of analysis performed in accordance with the finite element method for resonance frequency with respect to each of the magnetic head suspensions according to the first to fifth examples and the first to fifth comparative examples, and particularly.
Figure 8B:
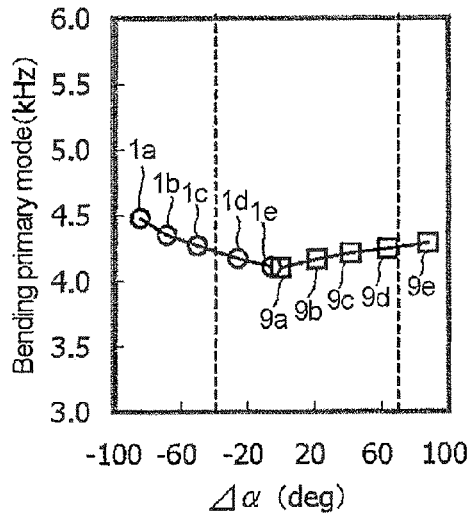
Figure 8C:
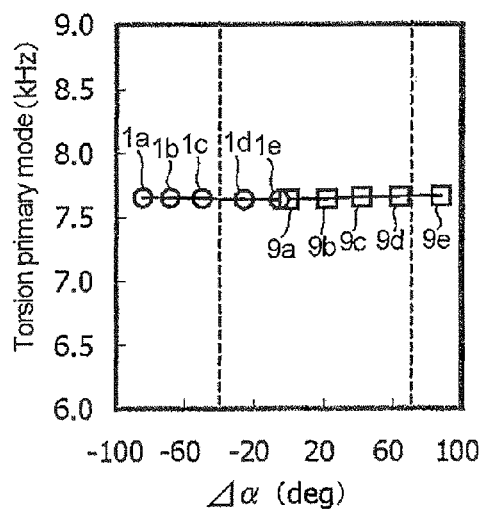
Figure 8D:
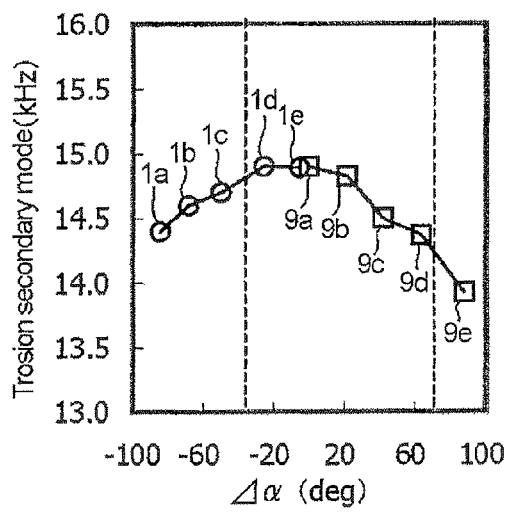
Figure 8E:
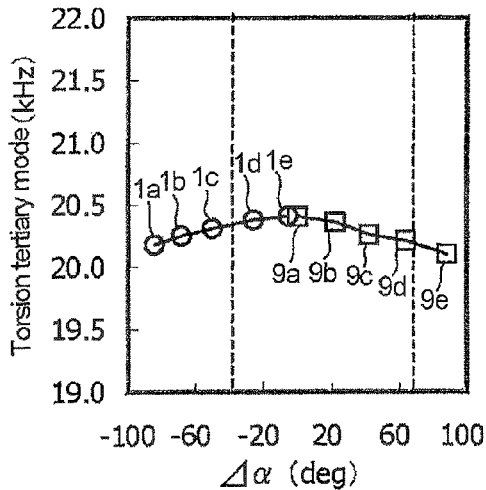

As seen in FIG. 8B, the configuration in which each of the paired connecting beams 14 is bent at the connection point CP is capable of raising the resonance frequency in the first torsion mode in comparison to the configuration in which each of the paired connecting beams 14 is formed into the linear shape.

Further, as apparent from FIGS. 8A to 8E, the configuration, in which the longitudinal direction of the distal-side beam 142 is inclined with respect to the longitudinal direction of the proximal-side beam 141 in a plan view such that the connection point CP is located closer to the suspension longitudinal center line CL relative to the virtual line IL realizes improved resonance frequency characteristics in the first bending mode and the second torsion mode while having similar resonance frequency characteristics in the main resonance mode, the first torsion mode, and the third torsion mode, in comparison to the configuration in which the longitudinal direction of the distal-side beam 142 is inclined with respect to the longitudinal direction of the proximal-side beam 141 in a plan view such that the connection point CP is located farther away from the suspension longitudinal center line CL relative to the virtual line IL.

From this fact, the magnetic head suspension 1A according to the present embodiment is recognized as improving the resonance frequency characteristic in comparison to a magnetic head suspension in which the longitudinal direction of the distal-side beam 142 is inclined with respect to the longitudinal direction of the proximal-side beam 141 in a plan view such that the connection point CP is located farther away from the suspension longitudinal center line CL relative to the virtual line IL.

Moreover, as shown in FIGS. 1A, 1B, and 2, in the magnetic head suspension 1A according to the present embodiment, the proximal-side beam 141 is inclined so as to be brought gradually closer to the suspension longitudinal center line CL from the proximal end toward the distal end thereof.

This configuration makes it possible to increase the distance in the suspension width direction between the proximal ends of the proximal-side beams 141 of the paired connecting beams 14, thereby achieving stable support of the distal end section 12 by the paired connecting beams 14.

Second Embodiment

Hereinafter, another embodiment of the magnetic head suspension according to the present invention will be described, with reference to the attached drawings.

Figure 9:
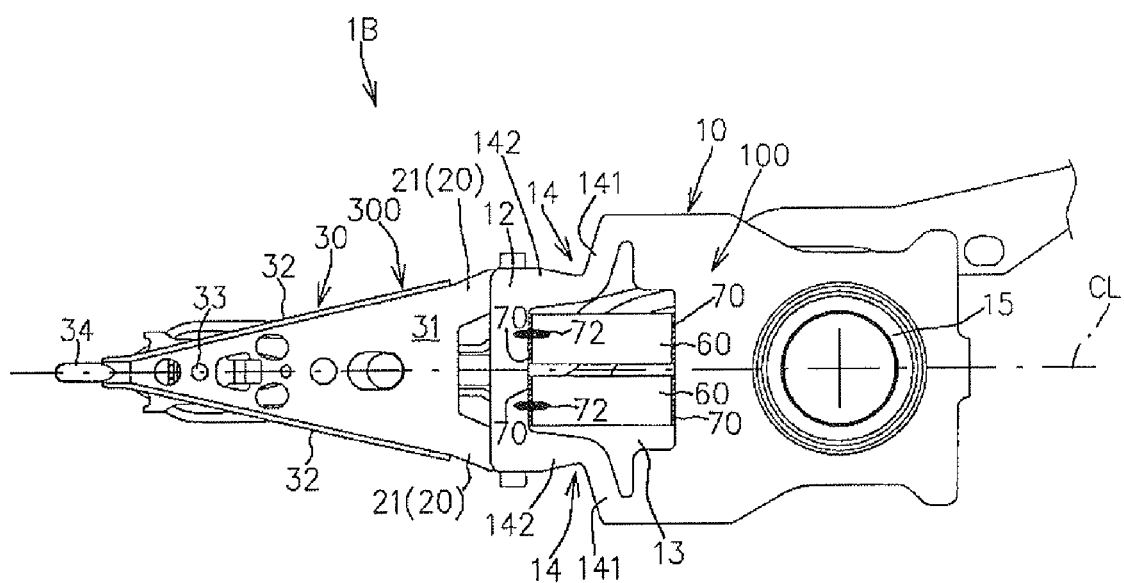
FIG. 9 is a top view of a magnetic head suspension according to a second embodiment of the present invention.

FIG. 9 is a top view (a plan view as viewed from a side opposite from the disk surface) of a magnetic head suspension 1B according to the present embodiment.

In the figure, the members same as those in the first embodiment are denoted by the same reference numerals to omit the detailed description thereof.

As shown in FIG. 9, the magnetic head suspension 1B according to the present embodiment is different from the magnetic head suspension 1A according to the first embodiment only in that the shape of the distal-side beam 142 is changed.

More specifically, in the first embodiment, the width of the distal-side beam 142 is substantially constant in the entire region in the longitudinal direction.

To the contrary, in the present embodiment, the width of the distal-side beam 142 is increased gradually toward the distal end from the proximal end that is connected to the corresponding proximal-side beam 141.

With regard to each of the magnetic head suspension 1B according to the present embodiment and the magnetic head suspension 1A according to the first embodiment, the micro motion characteristic of the magnetic head slider 50 in the seek direction as well as the resonance frequency in the main resonance mode were analyzed in accordance with the finite element method. The micro motion characteristic for the former was 8.3 nm/V and that for the latter was 8.5 nm/V. The resonance frequency in the main resonance mode for the former was 26.5 kHz and that for the latter was 26.3 kHz.

According to these results, the magnetic head suspension 1B according to the present embodiment is recognized as raising the resonance frequency of the magnetic head slider 50 in the main resonance mode in comparison to the magnetic head suspension 1A according to the first embodiment.

Third Embodiment

Hereinafter, still another embodiment of the magnetic head suspension according to the present invention will be described, with reference to the attached drawings.

Figure 10A:
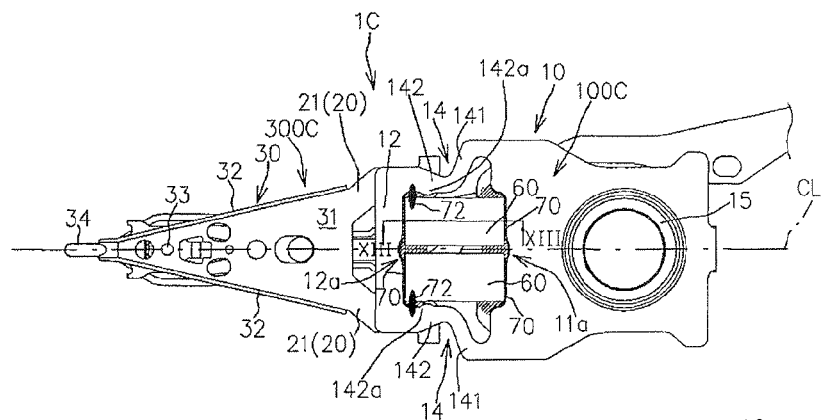
FIGS. 10A to 10C are a top view, a bottom view, and a side view of a magnetic head suspension according to a third embodiment of the present invention, respectively.
Figure 10B:
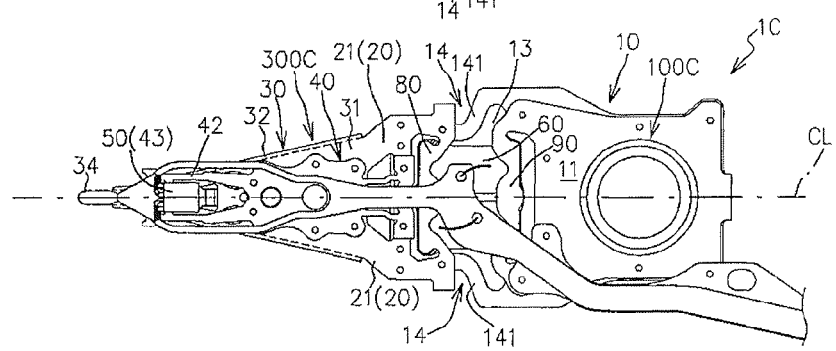
Figure 10C:
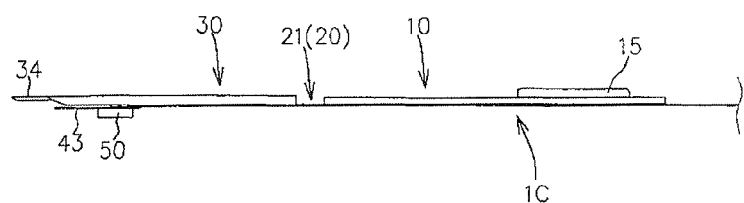

FIGS. 10A to 10C are a top view (a plan view as viewed from a side opposite from the disk surface), a bottom view (a bottom plan view as viewed from a side close to the disk surface) and a side view of a magnetic head suspension 1C according to the present embodiment, respectively. FIG. 10B indicates welding points with using small circles.

The magnetic head suspension 1C according to the present embodiment is mainly different from the magnetic head suspension 1A according to the first embodiment in that there are further provided a distal-end-side support plate 80 and a proximal-end-side support plate 90 on which the distal and proximal sides of the paired piezoelectric elements 60 are mounted, respectively.

Figure 11:
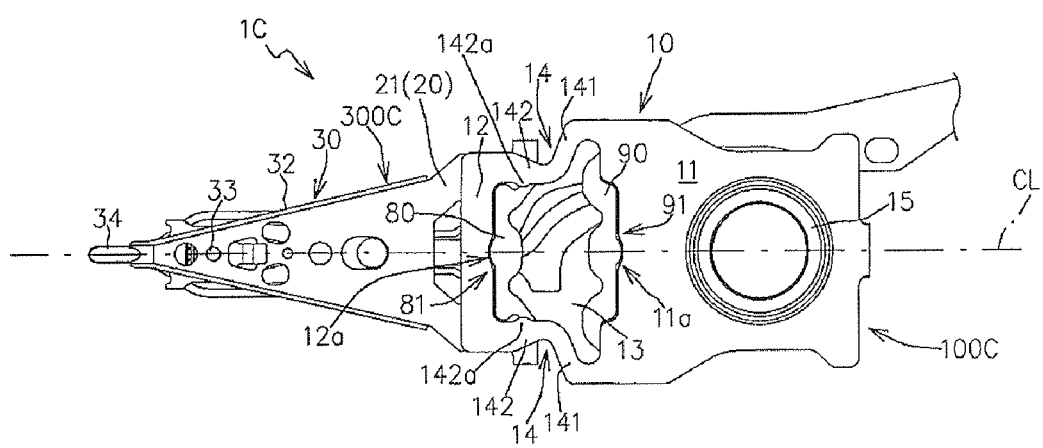
FIG. 11 is a top view of the magnetic head suspension shown in FIG. 10 in a state where paired piezoelectric elements are removed.

FIG. 11 is a top view of the magnetic head suspension 1C in a state where the paired piezoelectric elements 60 are removed.

Figure 12:
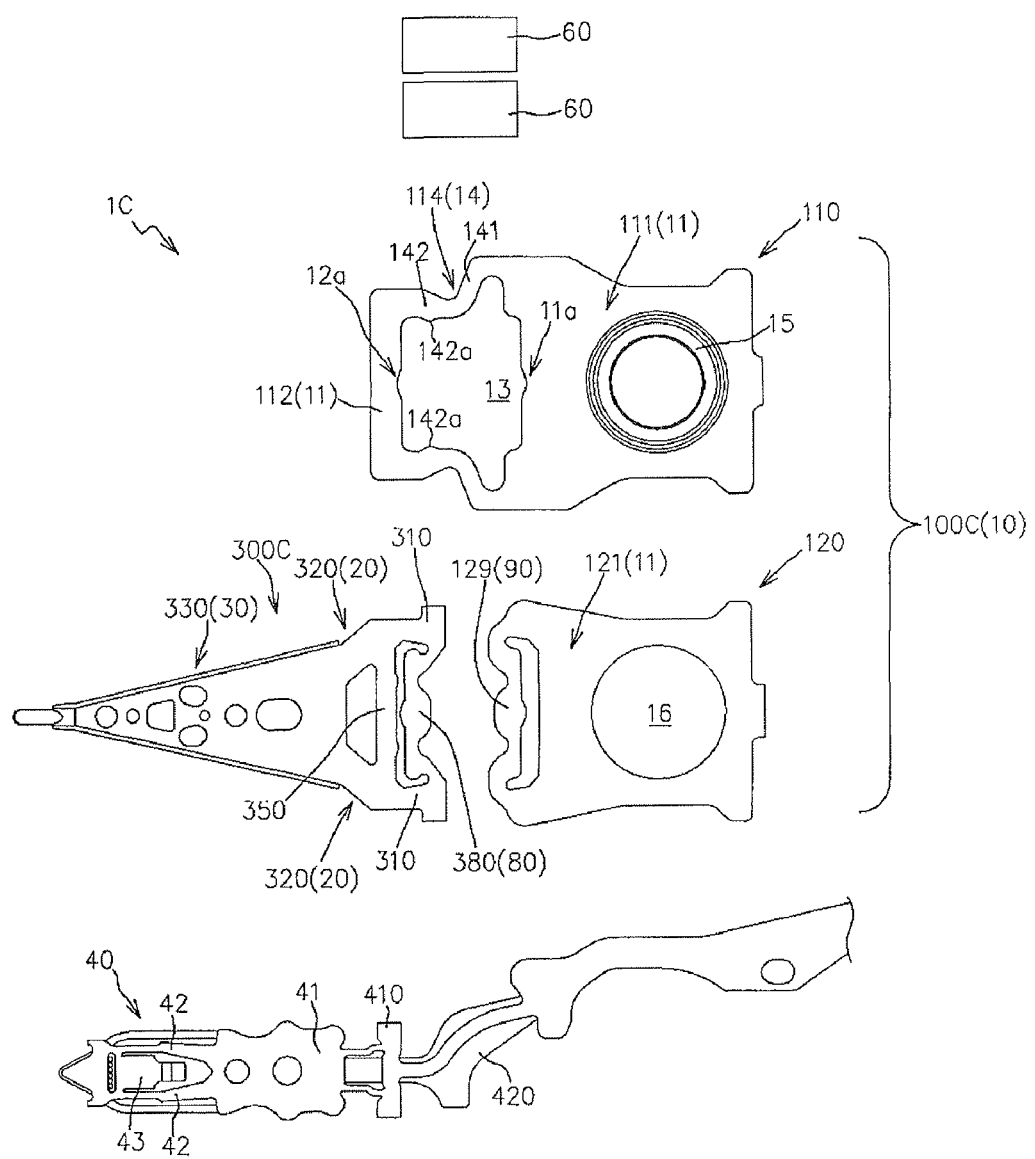
FIG. 12 is an exploded top view of the magnetic head suspension shown in FIG. 10.

FIG. 12 is an exploded top view of the magnetic head suspension 1C.

Figure 13:
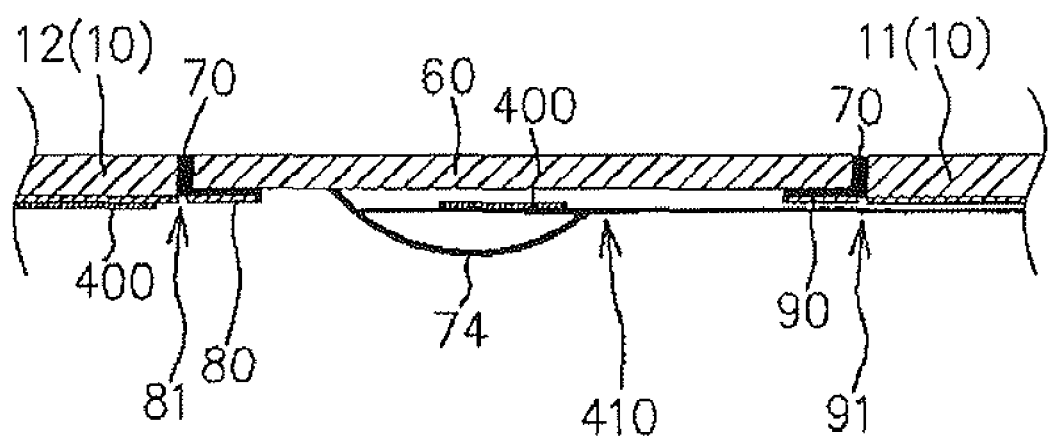
FIG. 13 is a cross sectional view taken along line XIII-XIII in FIG. 10A.

FIG. 13 is a cross sectional view taken along line XIII-XIII in FIG. 10A.

As shown in FIGS. 9 to 13, the distal-end-side support plate 80 is connected to the lower surface (the surface facing the disk surface) of the supporting part 10, and is configured so that the lower surfaces, which face the disk surface, of the distal sides of the paired piezoelectric elements 60 are mounted on an upper surface of the distal-end-side support plate 80.

Provision of the distal-end-side support plate 80 improves efficiency in attaching the paired piezoelectric elements 60 to the distal end section 12.

More specifically, an insulative adhesive agent 70 is applied to the upper surface (not facing the disk surface) of the distal-end-side support plate 80 and the paired piezoelectric elements 60 are then placed on the upper surface of the distal-end-side support plate 80, so that the insulative adhesive agent 70 is spread between the end surfaces on the distal ends of the paired piezoelectric elements 60 and the end surface on the proximal end of the distal end section 12 of the supporting part 10.

As shown in FIGS. 11 and 13, in the case of the present embodiment where the distal-end-side support plate 80 is provided separately from the supporting part 10, the distal-end-side support plate 80 is preferably connected to the supporting part 10 so as to form a gap 81 between the distal edge of the distal-end-side support plate 80 and the proximal edge of the distal end section 12 of the supporting part 10 in a plan view as viewed along a direction perpendicular to the disk surface.

Such a configuration exerts the following effect.

Specifically, it may be possible to configure the distal-end-side support plate 80 so as to cross over the proximal edge of the distal end section 12 in a plan view, that is, to provide the distal-end-side support plate 80 in such a manner as that its distal end overlaps with the distal end section 12 in a plan view. However, when the insulative adhesive agent is applied onto the upper surface of the distal-end-side support plate 80 and the paired piezoelectric elements 60 are then placed on the upper surface of the distal-end-side support plate 80 so as to fix the paired piezoelectric elements 60 onto the distal end section 12, this configuration may cause the insulative adhesive agent 70 to enter between the distal-end-side support plate 80 and the distal end section 12, which are ideally in intimate contact with each other. Both of the distal-end-side support plate 80 and the distal end section 12 are provided as rigid members such as SUS and are ideally in intimate contact with each other. Accordingly, if the insulative adhesive agent 70 enters between these two members, the filler included in the insulative adhesive agent 70 may get out of the location between these two members in accordance with the expansion and contraction motion of the paired piezoelectric elements 60.

On the other hand, such a defect can be effectively prevented in the configuration where the distal-end-side support plate 80 is disposed so as to provide the gap 81 between the distal edge of the distal-end-side support plate 80 and the proximal edge of the distal end section 12 in a plan view.

In the present embodiment, the distal-end-side support plate 80 is integrally formed with a load beam part component 300C that integrally forms the load beam part 30 and the load bending part 20.

Specifically, as shown in FIG. 12, the load beam part component 300C includes a load beam part forming region 330 that forms the load beam part 30, paired load bending part forming region 320 that forms the paired leaf springs 21 functioning as the load bending part 20, paired supporting part fixed region 310 that extend toward the proximal end side of the suspension from the paired load bending part forming region 320 and is fixed to the supporting part 10 in a state of being brought into contact therewith, a connecting region 350 that connects the paired supporting part fixed region 310 in a state of overlapping with the distal end section 12 in a plan view, and distal-end-side support plate forming region 380 that is positioned on the distal end side of the connecting region 350 and connects the paired supporting part fixed region 30 so as to form the distal-end-side support plate 80.

In the configuration including the distal-end-side support plate 80 as in the present embodiment, the inner surface of each of the distal-side beams 142 that is directed inward in the suspension width direction is preferably formed to be brought closest to the outer surface of the corresponding piezoelectric element 60 that is directed outward in the suspension width direction at a position of the piezoelectric element 60 that is away by a predetermined distance from its distal end toward its proximal end.

This configuration can effectively prevent the insulative adhesive agent 70 from flowing out toward the proximal end in the suspension longitudinal direction from between the inner surface of each of the distal-side beams 142 and the outer surface of the corresponding piezoelectric element 60, when the insulative adhesive agent 70 is applied onto the upper surface of the distal-end-side support plate 80 and the paired piezoelectric elements 60 are then placed on the upper surface of the distal-end-side support plate 80 so as to fix the paired piezoelectric elements 60 onto the distal end section 12. Therefore suppressed are variation in the micro motion characteristic of the magnetic head slider 50 in the seek direction as well as variation in the resonance frequency characteristic of the magnetic head suspension 1C.

As shown in FIGS. 10A, 11, and 12, in the present embodiment, each of the distal-side beams 142 is provided on the inner surface with an inward projection 142a that projects inward in the suspension width direction at a position away by a predetermined distance from the distal end toward the proximal end of the corresponding piezoelectric element 60. Provision of the inward projection 142a prevents the insulative adhesive agent 70 from flowing out toward the proximal end in the suspension longitudinal direction.

As shown in FIGS. 10A to 10C, and 11 to 13, the proximal-end-side support plate 90 is connected to the lower surface (the surface facing the disk surface) of the supporting part 10, and is configured so that the lower surfaces, which face the disk surface, of the proximal sides of the paired piezoelectric elements 60 are mounted on an upper surface of the proximal-end-side support plate 90.

Provision of the proximal-end-side support plate 90 improves efficiency in attaching the paired piezoelectric elements 60 to the proximal end section 11.

More specifically, an insulative adhesive agent 70 is applied to the upper surface (not facing the disk surface) of the proximal-end-side support plate 90 and the paired piezoelectric elements 60 are then placed on the upper surface of the proximal-end-side support plate 90, so that the insulative adhesive agent 70 is spread between the end surfaces on the proximal ends of the paired piezoelectric elements 60 and the end surface on the distal end of the proximal end section 11 of the supporting part 10.

As shown in FIGS. 11 and 13, in the case of the present embodiment where the proximal-end-side support plate 90 is provided separately from the supporting part 10, the proximal-end-side support plate 90 is preferably connected to the supporting part 10 so as to form a gap 91 between the proximal edge of the proximal-end-side support plate 90 and the distal edge of the proximal end section 11 of the supporting part 10 in a plan view as viewed along a direction perpendicular to the disk surface.

Such a configuration exerts the following effect.

Specifically, it may be possible to configure the proximal-end-side support plate 90 so as to cross over the distal edge of the proximal end section 11 in a plan view, that is, to provide the proximal-end-side support plate 90 in such a manner as that its proximal end overlaps with the proximal end section 11 in a plan view. However, when the insulative adhesive agent is applied onto the upper surface of the proximal-end-side support plate 90 and the paired piezoelectric elements 60 are then placed on the upper surface of the proximal-end-side support plate 90 so as to fix the paired piezoelectric elements 60 onto the proximal end section 11, this configuration may cause the insulative adhesive agent 70 to enter between the proximal-end-side support plate 90 and the proximal end section 11, which are ideally in intimate contact with each other. Both of the proximal-end-side support plate 90 and the proximal end section 11 are provided as rigid members such as SUS and are ideally in intimate contact with each other. Accordingly, if the insulative adhesive agent 70 enters between these two members, the filler included in the insulative adhesive agent 70 may get out of the location between these two members in accordance with the expansion and contraction motion of the paired piezoelectric elements 60.

On the other hand, such a defect can be effectively prevented in the configuration where the proximal-end-side support plate 90 is disposed so as to provide the gap 91 between the proximal edge of the proximal-end-side support plate 90 and the distal edge of the proximal end section 11 in a plan view.

In the present embodiment, the proximal-end-side support plate is integrally formed with a supporting part component 100C that forms the supporting part 10.

More specifically, as shown in FIG. 12, the supporting part component 100C includes first and second plate-like members 110, 120 that are contacted and fixed to each other.

The first plate-like member 110 integrally includes a region 111 corresponding to the proximal end section 11, a region 114 corresponding to the paired connecting beams 14, and a region 112 corresponding to the distal end section 112.

The second plate-like member 120 integrally includes a region 121 corresponding to the proximal end section 11, and a region 129 corresponding to the proximal-end-side support plate 90.

The first and second plate-like members 110, 120 are fixed to each other by welding in a state where the respective regions 111, 121 corresponding to the proximal end section 11 are overlapped with each other.

In the present embodiment, as shown in FIG. 12, the first plate-like member 110 is provided with the boss portion 15, and the second plate-like member 120 is formed with an opening 16 having a diameter larger than that of a boss hole of the boss portion.

Furthermore, as shown in FIGS. 10A, 11, and 12, in the present embodiment, the distal end section 12 is provided on the proximal edge thereof with a suspension width central portion 12a that has a concave shape open toward the proximal end in the suspension longitudinal direction in a plan view.

More specifically, the suspension width central portion 12a provided on the proximal edge of the distal end section 12 has the concave shape in a plan view so as to be located on the most distal end in the suspension longitudinal direction at its center that is crossed with the suspension longitudinal center line CL as well as to be brought closer to the proximal end in the suspension longitudinal direction as extending outward both in the suspension width direction from the center.

This configuration suppresses the stress from being concentrated onto the suspension width central portion 12a of the distal end section 12 upon the expansion and contraction motion of the paired piezoelectric elements 60, thereby preventing the insulative adhesive agent 70 from being separated, detached, or the like.

Similarly, as shown in FIGS. 10A, 11 and 12, the proximal end section 11 is provided on the distal edge thereof with a suspension width central portion 11a that has a concave shape open toward the distal end in the suspension longitudinal direction in a plan view.

More specifically, the suspension width central portion 11a provided on the distal edge of the proximal end section 11 has the concave shape in a plan view so as to be located on the most proximal end in the suspension longitudinal direction at its center that is crossed with the suspension longitudinal center line CL as well as to be brought closer to the distal end in the suspension longitudinal direction as extending outward both in the suspension width direction from the center.

This configuration suppresses the stress from being concentrated onto the suspension width central portion 11a of the proximal end section 11 upon the expansion and contraction motion of the paired piezoelectric elements 60, thereby preventing the insulative adhesive agent 70 from being separated, detached, or the like.

Of course, the formation of the suspension width central portion 12a of the proximal edge of the distal end section 12 and/or the suspension width central portion 11a of the distal edge of the proximal end section 11 into the concave shape in a plan view could be also applied to the magnetic head suspensions 1A, 1B according to the first and second embodiments as well as a magnetic head suspension according to a modified embodiment that is described later.

Although the supporting part 10 is in the form of the base plate in each of the embodiments, it is of course that the present invention is not limited to the configuration. That is, an arm with a proximal end connected to the swing center of the main actuator could be adopted as the supporting part 10.

Figure 14:
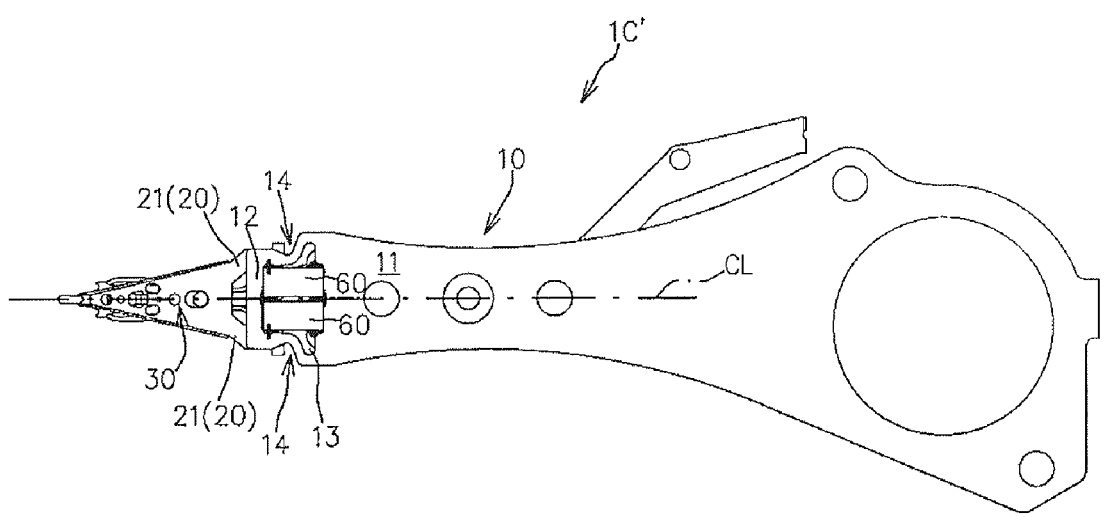
FIG. 14 is a top view of a magnetic head suspension according to a modification of the third embodiment.

FIG. 14 is a top view of a magnetic head suspension 1C' according to a modified embodiment of the present invention in which the supporting part 10 is changed to the arm in comparison with the magnetic head suspension 1C according to the third embodiment.

Further, although, in each of the embodiments, the paired piezoelectric elements 60 are disposed within the open section 13, the present invention is not limited to the configuration.

More specifically, each of the paired piezoelectric elements 60 can be disposed so as to have the distal end placed on the upper surface of the distal end section 12 and the proximal end placed on the upper surface of the proximal end section 11 while crossing over the open section 13 in the suspension longitudinal direction.

Figure 15A:
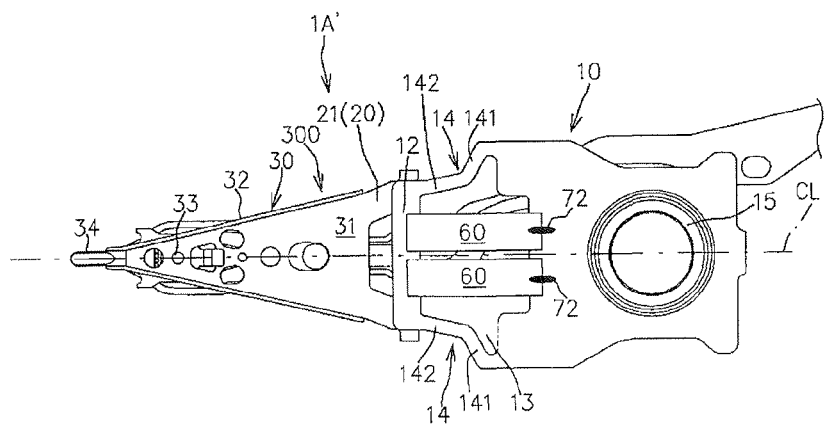
FIGS. 15A to 15C are a top view, a bottom view and a side view of a magnetic head suspension according to a modification of the first embodiment, respectively.
Figure 15B:
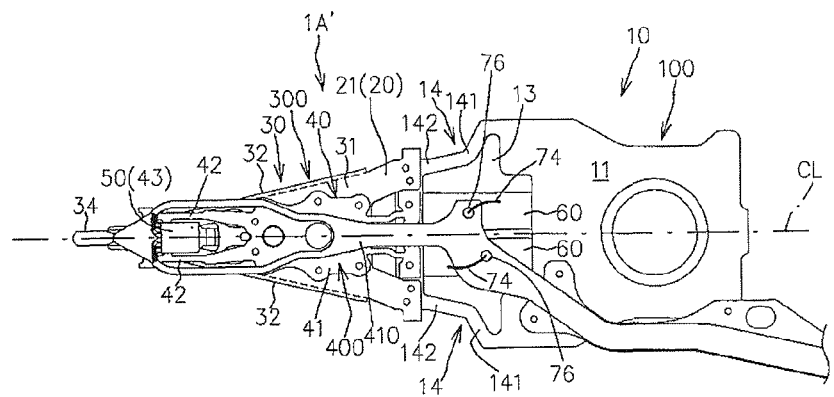
Figure 15C:
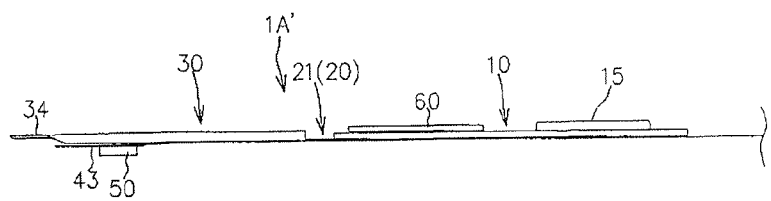

FIGS. 15A to 15C are a top view, a bottom view, and a side view, respectively, of a magnetic head suspension 1A' according to a modification of the present invention, which is obtained by modifying the magnetic head suspension 1A according to the first embodiment in such a manner as described above.

In the magnetic head suspension 1A' shown in FIGS. 15A to 15C, although the thickness in the z direction is increased, the paired piezoelectric elements 60 can be fixed to the supporting part 10 more easily.

Fourth Embodiment

Hereinafter, still another embodiment of the magnetic head suspension according to the present invention will be described, with reference to the attached drawings.

Figure 16A:
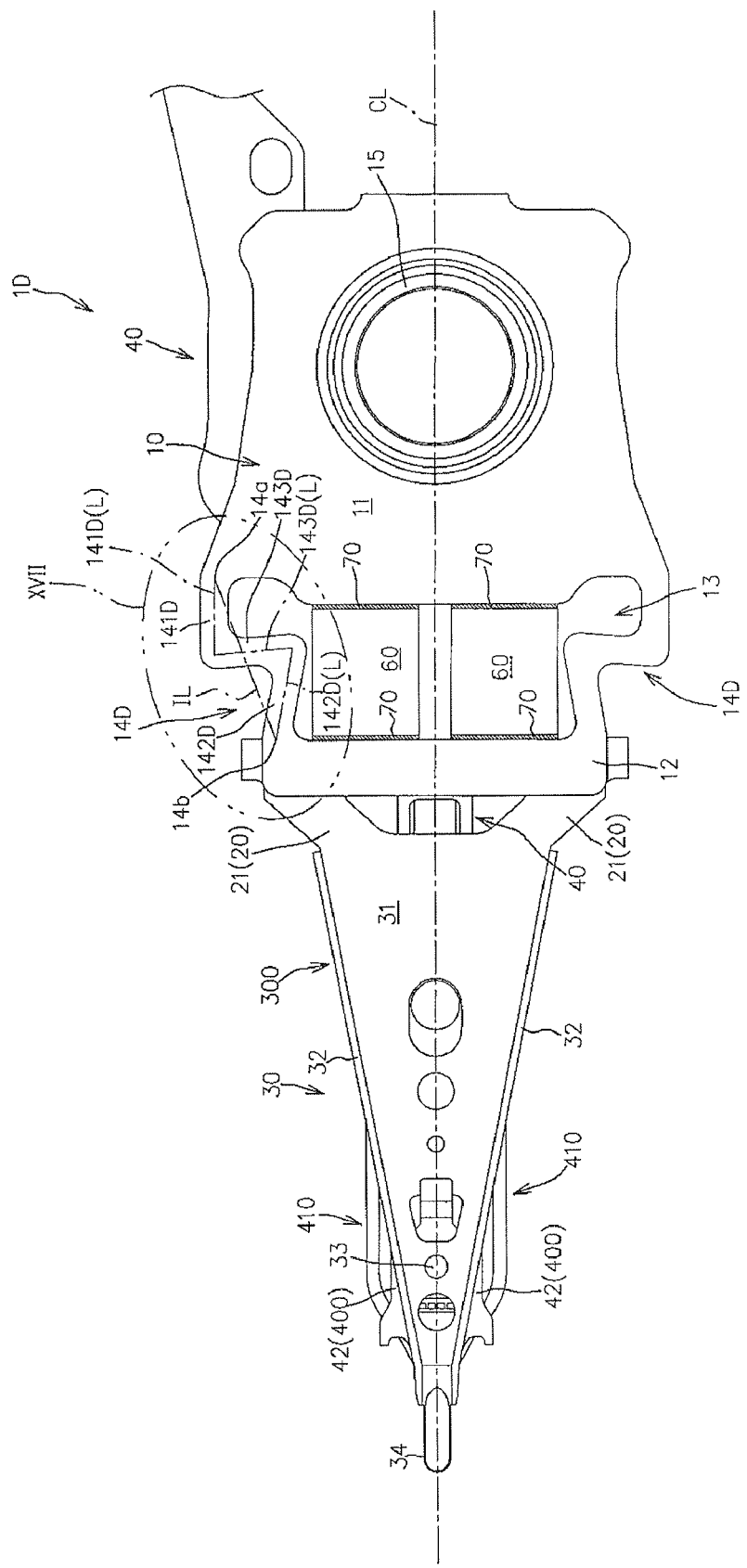
FIG. 16A is a top view of a magnetic head suspension according to a fourth embodiment of the present invention.
Figure 16B:
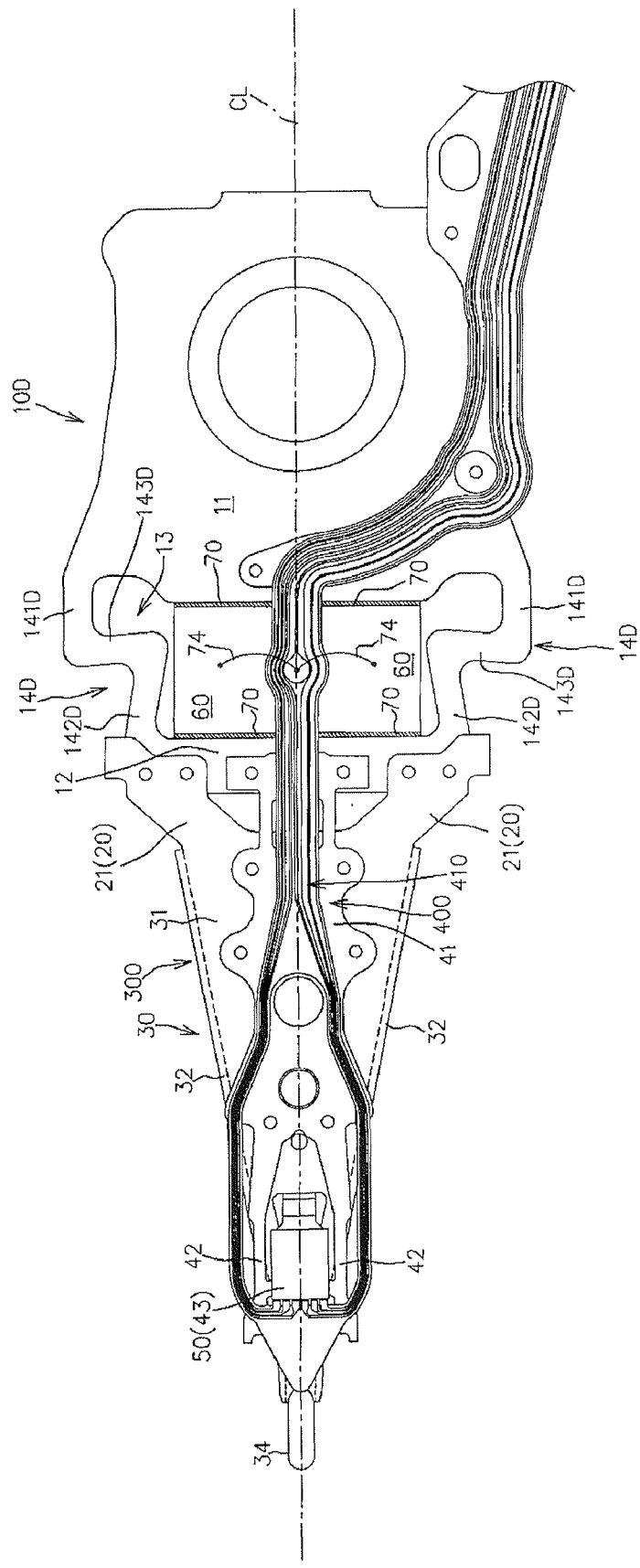
FIG. 16B is a bottom view of the magnetic head suspension according to the fourth embodiment.

FIGS. 16A and 16B are a top view (a plan view as viewed from a side opposite from the disk surface) and a bottom view (a bottom plan view as viewed from a side close to the disk surface) of a magnetic head suspension 1D according to the present embodiment, respectively. FIG. 16B indicates welding points with using small circles.

As shown in FIGS. 16A and 16B, the magnetic head suspension 1D includes the load bending part 20 that generates the load for pressing the magnetic head slider 50 toward the disk surface, the load beam part 30 that transmits the load to the magnetic head slider 50, the supporting part 10 that supports the load beam part 30 via the load bending part 20 and is swung about the swing center directly or indirectly by the main actuator, the flexure part 40 that is supported by the load beam part 30 and the supporting part 10 while supporting the magnetic head slider 50, and the paired right and left piezoelectric elements 60 that are attached to the supporting part 10 so as to be symmetrical with each other with respect to the suspension longitudinal center line CL and have expansion and contraction directions different from each other, in order to enable micro motion of the magnetic head slider 50 in the seek direction.

The supporting part 10 is a member for supporting the load beam part 30 through the load bending part 20 while being directly or indirectly connected to the main actuator such as the voice coil motor, and is therefore made to have relatively high rigidity.

In the present embodiment, the supporting part 10 is formed as the base plate including the boss portion 15 to which the distal end of the carriage arm (not shown) is joined by a swage processing, the carriage arm being connected to the main actuator.

The supporting part 10 may be preferably made from, for example, a stainless plate having a thickness of 0.1 mm to 0.8 mm.

It is, of course, possible to adopt, as the supporting part 10, the arm that has a proximal end connected to the swing center of the main actuator.

The supporting part 10 includes the proximal end section 11 that is directly or indirectly connected to the main actuator, the distal end section 12 to which the load bending part 20 is connected, the open section 13 that is positioned between the proximal end section 11 and the distal end section 12 in the suspension longitudinal direction, and paired right and left connecting beams 14D that are positioned on both sides of the open section 13 in the suspension width direction and connect the proximal end section 11 and the distal end section 12.

Detailed configuration of the paired connecting beams 14 will be later explained.

As described above, the load beam part 30 is a member for transmitting the load generated by the load bending part 20 to the magnetic head slider 50, and therefore is required to have a predetermined rigidity.

As shown in FIGS. 16A and 16B, in the present embodiment, the load beam part 30 has the plate-like main body portion 31 and the flange portions 32 that are formed by being bent in a direction away from the disk surface at both sides of the main body portion 31 in the suspension width direction, and secures the rigidity by the flange portions 32.

The load beam part 30 may be made from, for example, a stainless plate having a thickness of 0.02 mm to 0.1 mm.

Specifically, the load beam part 30 is provided, at its distal end section, with the protrusion 33 that is so-called dimple.

The protrusion 33 is protruded by, for example, about 0.05 mm to 0.1 mm, in a direction toward the disk surface. The protrusion 33 is brought into contact with the upper surface (the surface opposite from the disk surface) of the head-mounting region 43 of the flexure part 40, so that the load is transmitted to the head-mounting region 43 of the flexure part 40 through the protrusion 33.

In the present embodiment, the load beam part 30 further integrally includes the lift tab 34 that extends from the distal end of the main body portion 31 toward the distal end side in the suspension longitudinal direction. The lift tab 34 is a member that engages with the lamp provided in the magnetic disk device so as to cause the magnetic head suspension 50 to be away from the disk surface in z direction (the direction perpendicular to the disk surface) at the time when the magnetic head suspension 1D is swung by the main actuator so that the magnetic head slider 50 is positioned outward the disk surface in the radial direction.

The load bending part 20 has the proximal end connected to the supporting part 10 and the distal end connected to the load beam part 30, and generates the load for pressing the magnetic head suspension 50 toward the disk surface in accordance with its elastic deformation.

As shown in FIGS. 16A and 16B, in the present embodiment, the load bending part 20 includes the paired right and left leaf springs 21 that are disposed so that their plate surfaces face the disk surface.

Preferably, the paired leaf springs 21 are elastically bended in such a direction as to cause the magnetic head suspension 50 to be come close to the disk surface before the magnetic head suspension 1A is mounted to the magnetic disk device, and is mounted to the magnetic disk device in a state where the paired leaf springs are elastically bended back so as to generate the pressing load.

The load bending part 20 is made from a stainless steel plate of 0.02 mm to 0.1 mm thick, for example.

In the present embodiment, as shown in FIGS. 16A and 16B, the load bending part 20 is integrally formed with the load beam part 30.

More specifically, the magnetic head suspension 1D according to the present embodiment includes the load beam part component 300 that integrally form the load beam part 30 and the load bending part 20. The load beam part component 300 is welded to the supporting part 10 in a state where the upper surface of the load beam part component 300 that is poisoned on a side opposite from the disk surface is brought into contact with the lower surface, which faces the disk surface, of the distal end section 12 of the supporting part 10.

The flexure part 40 is fixed to the load beam part 30 and the supporting part 10 while supporting the magnetic head slider 50.

Specifically, the flexure part 40 includes, as shown in FIG. 13B, the body region 41 that is fixed to the surface of the load beam part 30 that faces the disk surface by welding or the like, the paired supporting pieces 42 that extends from the body region 41 toward the distal end side, and the head-mounting region 43 that is supported by the supporting pieces 42.

The head-mounting region 43 supports the magnetic head slider 50 at the lower surface that faces the disk surface, as shown in FIG. 16B.

As described above, the protrusion 33 is brought into contact with the upper surface of the head-mounting region 43, so that the head-mounting region 43 could sway flexibly in a roll direction and in a pitch direction, with the protrusion 33 functioning as a fulcrum.

The flexure part 40 has rigidity lower than that of the load beam part 30, so that the head-mounting region 43 could sway in the roll direction and in the pitch direction.

The flexure part 40 may be preferably made from, for example, a stainless plate having a thickness of 0.01 mm to 0.025 mm.

In the present embodiment, the flexure part 40 is provided integrally with the wiring that is in the form of a printed circuit and transmits a writing signal and/or a reading signal to/from the magnetic head slider 50.

That is, the flexure part 40 has the flexure base plate 400 integrally including the body region 41, the supporting pieces 42 and the head-mounting region 43, and the flexure wiring structure 410 that is at least partially laminated on the flexure base plate 400.

The flexure wiring structure 410 may include the insulating layer laminated on the lower surface of the flexure base plate 400 that faces the disk surface, the conductor layer laminated on the lower surface of the insulating layer that faces the disk surface, and the cover layer enclosing the conductor layer.

In the present embodiment, the flexure base plate 400 is fixed by welding to the main body portion 31 of the load beam part 30, and the distal end section 12 and the proximal end section 11 of the supporting part 10.

Each of the piezoelectric elements 60 has the main body made of PZT (lead zirconate titanate) and the paired electrode layers disposed on both ends of the main body in the thickness direction thereof.

The main body is 0.05 mm to 0.3 mm thick, for example, and the electrode layers are each made of Ag or Au so as to have a thickness from 0.05 μm to several μm.

As shown in FIGS. 16A and 16B, each of the paired piezoelectric elements 60 has the proximal end connected to the proximal end section 11 and the distal end connected to the distal end section 12 in a state of being at least partially overlapped with the open section 13 in a plan view as viewed along the direction perpendicular to the disk surface. Further, the paired piezoelectric elements 60 are arranged in such a manner as that one of them expands and the other one of them contracts in accordance with application of a voltage so that the piezoelectric elements 60 function as a sub actuator for causing the magnetic head slider 50 to perform micro motion in the seek direction.

In the present embodiment, as shown in FIGS. 16A and 16B, the paired piezoelectric elements 60 are wholly disposed within the open section 13 in a plan view as viewed along the direction perpendicular to the disk surface.

More specifically, the distal ends and the proximal ends of the paired piezoelectric elements 60 are fixed to the distal end section 12 and the proximal end section 11, respectively, in a state where the paired piezoelectric elements 60 are disposed in the open section 13 such that the end surfaces on the distal end sides and the end surfaces on the proximal end sides of the paired piezoelectric elements 60 are opposed at least partially to the proximal end surface of the distal end section 12 and the distal end surface of the proximal end section 11, respectively.

According to the configuration, the expansion and contraction motion of the paired piezoelectric elements 60 can be transmitted as much as possible as displacement of the magnetic head slider 50 in the seek direction.

Moreover, according to the above configuration, the paired piezoelectric elements 60 can be overlapped partially or entirely with the supporting part 10 in the thickness direction.

Therefore, it is possible to reduce as much as possible the thickness of the entire magnetic head suspension 1C inclusive of the paired piezoelectric elements 60.

In the present embodiment, the paired piezoelectric elements 60 have the end surfaces on the distal end side that are fixed to the proximal end surfaces of the distal end section 12 by the fixing member 70 such as an insulative adhesive agent and the end surfaces on the proximal end side that are fixed to the distal end surface of the proximal end section 11 by the fixing member 70 such as the insulative adhesive agent in a state where the paired piezoelectric elements 60 are wholly arranged in the open section 13 in a plan view.

That is, the expansion and contraction motion of the paired piezoelectric elements 60 is transmitted to the distal end section 12 and the proximal end section 11 via the fixing members 70.

As shown in FIGS. 16A and 16B, in the present embodiment, the paired piezoelectric elements 60 are disposed such that longitudinal directions (in other words, the expansion and contraction directions) thereof are aligned along the suspension longitudinal direction. However, the present invention is not limited to such a configuration.

More specifically, the longitudinal directions of the paired piezoelectric elements 60 may be inclined with respect to the suspension longitudinal direction as long as the paired piezoelectric elements 60 are disposed symmetrically with each other with respect to the suspension longitudinal center line CL and each of the longitudinal directions of the paired piezoelectric elements 60 has an element along the suspension longitudinal direction.

Application of a voltage to the paired piezoelectric elements 60 can be made with use of the flexure wiring structure 410, for example.

More specifically, the conductor layer of the flexure wiring structure 410 may be configured so as to have a piezoelectric element conductive member as well as a slider conductive member electrically connected to the magnetic head slider 50, and the electrode layer on the lower side (the side facing the disk surface) of each of the paired piezoelectric elements 60 may be electrically connected to the piezoelectric element conductive member.

The electric connection could be made by, for example, wire bonding, or conductive adhesive agent.

The electrode layer on the upper side (the side opposite from the disk surface) of each of the paired piezoelectric elements 60 is electrically connected to the supporting part 10 via a conductive member such as a conductive adhesive agent so as to have a ground potential.

The configuration of the paired connecting beams 14D is now explained.

Figure 17:
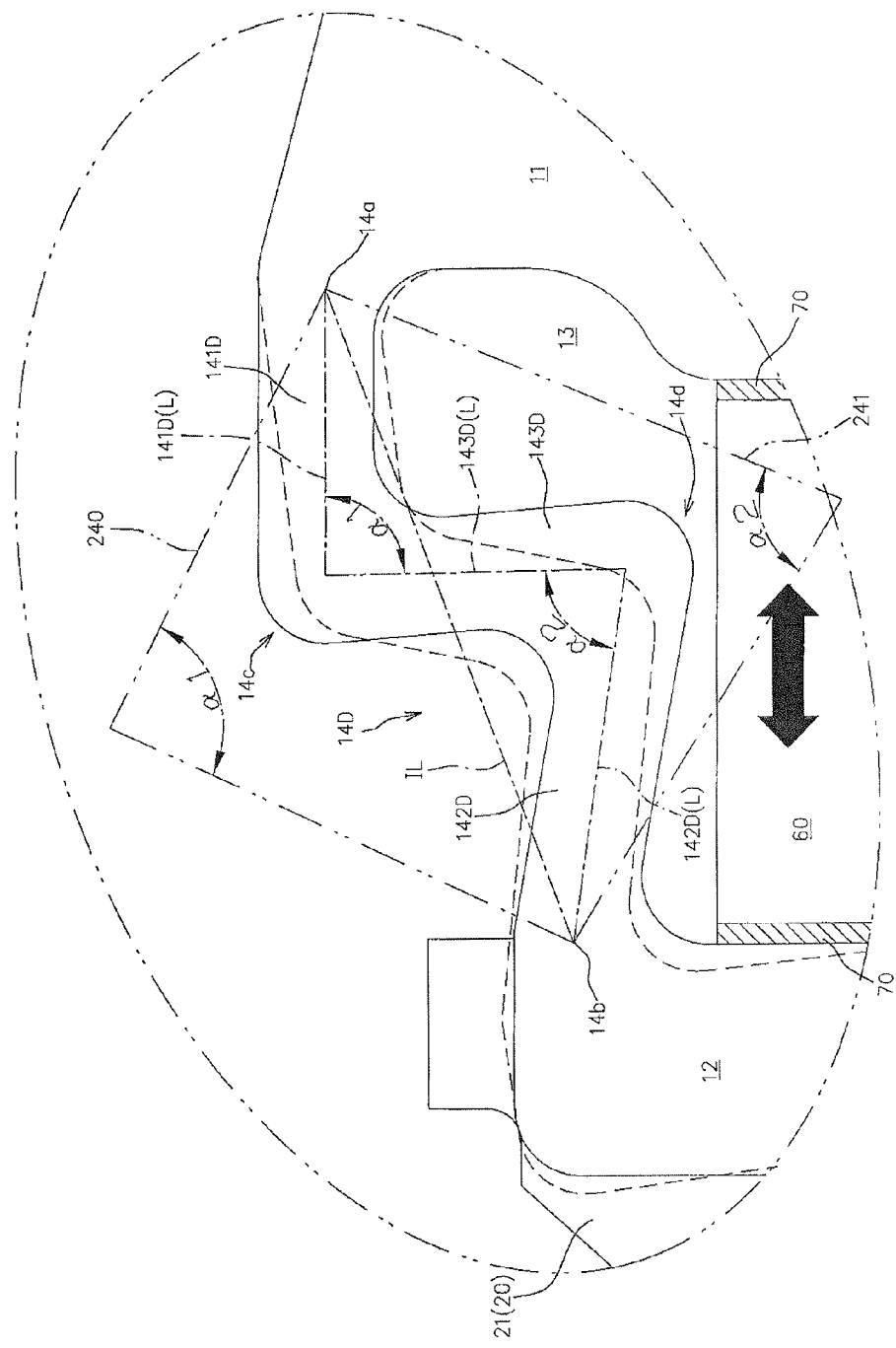
FIG. 17 is an enlarged view of XVII portion in FIG. 16A.

FIG. 17 is an enlarged view of XVII portion in FIG. 16A.

The paired connecting beams 14D are symmetrical to each other with respect to the suspension longitudinal center line CL, as shown in FIGS. 16A and 16B.

In the connecting beam 14D, the virtual line IL connecting the center point of the proximal end 14a to be connected to the proximal end section 11 and the center point of the distal end 14b to be connected to the distal end section 12 is gradually brought closer to the suspension longitudinal center line CL as it extends toward the distal end in the suspension longitudinal direction.

More specifically, in the present embodiment, the distal end section 12 of the supporting part 10 has a length in the suspension width direction shorter than that of the distal end of the proximal end section 11, so that the virtual line IL is brought closer to the suspension longitudinal center line CL as it extends toward the distal end in the suspension longitudinal direction.

Such a configuration is capable of reducing the moment of inertia of the sub actuator around the rotational center, thereby raising the resonance frequency in the main resonance mode.

Furthermore, in this configuration, the weight of the supporting part 10 can be reduced on the distal end, so that raised is the resonance frequency in the bending mode in the z direction perpendicular to the disk surface. As a result, reduced is the stress applied to the piezoelectric elements 60 upon reception of an impact force, thereby improving the impact resistance of the magnetic head suspension 1D.

Furthermore, in the present embodiment, the paired connecting beams 14D has a following structure in order to improve the micro motion characteristics in the seek direction of the magnetic head slider 50 by the paired piezoelectric elements 60.

More specifically, as shown in FIGS. 16A, 16B and 17, each of the paired connecting beams 14D includes a proximal-side beam 141D that extends from the proximal end 14a connected to the proximal end section 11 toward the distal side in the suspension longitudinal direction, a distal-side beam 142D that extends from the distal end 14b connected to the distal end section 12 toward the proximal side in the suspension longitudinal direction, and an intermediate beam 143D connecting a distal end of the proximal-side beam 141D and a proximal end of the distal-side beam 142D.

As shown in FIGS. 16A, 16B, and 17, in each of the connecting beams 14D, the connection point between the proximal-side beam 141D and the intermediate beam 143D configures a first bent portion 14c and the connection point between the distal-side beam 142D and the intermediate beam 143D configures a second bent portion 14d such that an intermediate beam longitudinal line 143D(L) connecting the center point of the proximal end and the center point of the distal end of the intermediate beam 143D is across the virtual line IL.

In such a configuration, the bend angles of the bent portions 14c and 14d, which are provided between the proximal end 14a and the distal end 14b of the connecting beam 14D, can be set within a range (such as ±60° from 90°) reasonably allowing the elastic deformation of the connecting beam 14D, without significantly extending the connecting beam 14D outward in the suspension width direction. Therefore, prevented as much as possible is deterioration in rigidity in the z direction perpendicular to the disk surface, and improved is the micro motion characteristic of the magnetic head slider 50 by the piezoelectric elements 60 (namely, the degree of easiness for displacement of the magnetic head slider 50 by the piezoelectric elements 60 in the seek direction in parallel with the disk surface).

More specifically, the expansion and contraction motion of the piezoelectric elements 60 in the suspension longitudinal direction causes elastic deformation of each of the connecting beams 14D so that the proximal end 14a and the distal end 14b of the connecting beam 14D are spaced apart from or brought closer to each other in the suspension longitudinal direction. Accordingly, the load bending part 20 and the load beam part 30 are swung in the seek direction so that the magnetic head slider 50 is shifted in the seek direction.

Therefore, in order to improve the micro motion characteristic in the seek direction of the magnetic head slider 50 by the piezoelectric elements 60, each of the connecting beams 14D needs to be formed so as to easily enables the elastic deformation of bringing the proximal end 14a and the distal end 14b of the connecting beam 14D close to each other in the suspension longitudinal direction as well as the elastic deformation of separating the proximal end 14a and the distal end 14b from each other in the suspension longitudinal direction.

In this regard, described first are the preferable ranges of the bend angles of the bent portions 14c and 14d that are provided in each of the connecting beams 14D.

For example, in a case where the connecting beam 14D is formed into a linear shape in the entire length (that is, the case where the connecting beam 14D is formed to be aligned along the virtual line IL, which corresponds to the case where the angle $\alpha 1$ or $\alpha 2$ shown in FIG. 17 is 180°), it is difficult to elastically deform the connecting beam 14D so that the proximal end 14a and the distal end 14b of the connecting beam 14D are brought closer to or spaced apart from each other by the expansion and contraction motion of the corresponding piezoelectric element 60.

To the contrary, in a case where the bent portion of the connecting beam 14D has a too small bend angle (that is, the case where the angle $\alpha 1$ or $\alpha 2$ shown in FIG. 17 is too much approximated to 0°), the connecting beam 14D is formed into a shape along the virtual line IL. In this case, it is also difficult to elastically deform the connecting beam 14D so that the proximal end 14a and the distal end 14b of the connecting beam 14D are brought closer to or spaced apart from each other by the expansion and contraction motion of the corresponding piezoelectric element 60.

In view of the above, the bent portions provided in the connecting beam 14D each have a preferable range of the bend angle (such as ±60° from 90°, namely, from 30° to 120°).

Described next is the preferable number of the bent portions that are provided in each of the connecting beams 14D.

As described above, in the present embodiment, each of the connecting beams 14D has the bent portion 14c (hereinafter, referred to as first bent portion) that is located at the connection point between the proximal-side beam 141D and the intermediate beam 143D as well as the bent portion 14d (hereinafter, referred to as second bent portion) that is located at the connection point between the distal-side beam 142D and the intermediate beam 143D.

As shown in FIG. 17, the first bent portion 14c is bent at the first bend angle $\alpha 1$ ($\alpha 1$=approximately 89° in this figure) which falls within the preferable range of the bend angle, and the second bent portion 14d is bent at the second bend angle $\alpha 2$ ($\alpha 2$=approximately 81° in this figure) which falls within the preferable range of the bend angle.

Consideration is given to a connecting beam 240 that has only one bent portion bent at the bend angle identical to the first bend angle $\alpha 1$. As shown in FIG. 17, the connecting beam 240 projects farther outward in the suspension width direction in comparison to the connecting beam 14D of the present embodiment, thereby causing deterioration in rigidity in the z direction perpendicular to the disk surface.

Furthermore, in the case where the connecting beam 14D is formed to project outward in the suspension width direction, there is caused a risk that the connecting beam 14D is brought into undesired contact with a different component configuring a hard disk drive.

As shown in FIG. 17, a connecting beam 241, which has only one bent portion bent at the bend angle identical to the second bend angle $\alpha 2$, is formed to project farther inward in the suspension width direction in comparison to the connecting beam 14D of the present embodiment.

Accordingly, in order to avoid an undesired contact with the corresponding piezoelectric element 60, the proximal end section 11 and the distal end section 12 of the supporting part 10 need to be extended outward in the suspension width direction so that the connecting beam 241 is located farther outside in the suspension width direction relative to the state shown in FIG. 17. As a result, deteriorated is the rigidity in the z direction perpendicular to the disk surface.

Moreover, in the case where the proximal end section 11 and the distal end section 12 of the supporting part 10 are projected outward in the suspension width direction, there is caused a risk that the proximal end section 11 or the distal end section 12 is brought into undesired contact with a different component configuring the hard disk drive.

To the contrary, as described above, each of the connecting beams 14D in the present embodiment is bent at two positions of the first bent portion 14c and the second bent portion 14d such that the intermediate beam longitudinal line 143D(L) is crossed with the virtual line IL.

Therefore, each of the bent portions 14c and 14d can be set to have a bend angle in the preferable range without significantly extending the connecting beam 14D outward in the suspension width direction. As a result, it is possible to improve the micro motion characteristic of the magnetic head slider 50 by the piezoelectric elements 60 while preventing as much as possible the deterioration in rigidity in the z direction perpendicular to the disk surface.

Furthermore, as shown in FIGS. 16A, 16B, and 17, in the present embodiment, the first bent portion 14c connecting between the proximal-side beam 141D and the intermediate beam 143D is located outside the virtual line IL in the suspension width direction, and the second bent portion 14d connecting between the distal-side beam 142D and the intermediate beam 143D is located inside the virtual line IL in the suspension width direction.

In this configuration, the distal-side beam 142D of the connecting beam 14D that is positioned on the distal side can be located as closer as possible to the suspension longitudinal center line CL, while the intermediate beam longitudinal line 143D(L) being crossed with the virtual line IL.

Therefore, it is possible to raise the resonance frequency in the main resonance mode in comparison to a configuration according to a modification in which the first bent portion 14c is located inside the virtual line IL in the suspension width direction and the second bent portion 14d is located outside the virtual line IL in the suspension width direction.

Fifth Embodiment

Hereinafter, still another embodiment of the magnetic head suspension according to the present invention will be described, with reference to the attached drawings.

Figure 18:
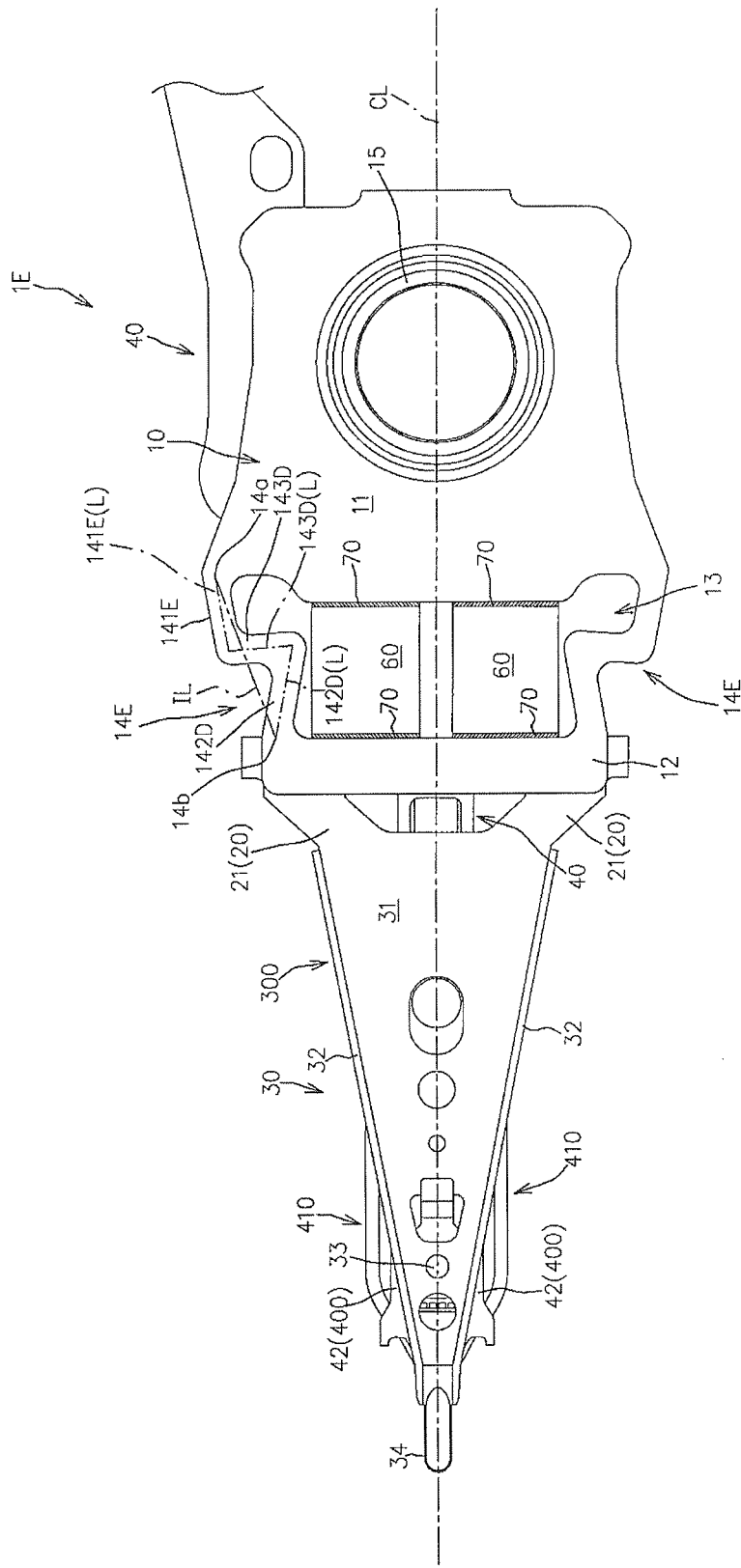
FIG. 18 is a top view of a magnetic head suspension according to a fifth embodiment of the present invention.

FIG. 18 is a top view (a plan view as viewed from a side opposite from the disk surface) of a magnetic head suspension 1E according to the present embodiment.

In the figure, the members same as those in the above-explained embodiments are denoted by the same reference numerals to omit the detailed description thereof.

The magnetic head suspension 1E according to the present embodiment is different from the magnetic head suspension 1D in that the connecting beams 14D are replaced with connecting beams 14E.

Specifically, in the fourth embodiment, as shown in FIGS. 16A, 16B and 17, the proximal-side beam 141D of each of the connecting beams 14D is arranged so that a proximal-side beam longitudinal line 141D(L), which connects the center point of the proximal end 14a and a center point of a distal end, is substantially parallel to the expansion and contraction direction of each of the paired piezoelectric elements 60.

That is, in the fourth embodiment, each of the piezoelectric elements 60 is arranged so that the expansion and contraction direction is along the suspension longitudinal direction, and the proximal-side beam 141D is arranged so that proximal-side beam longitudinal line 141D(L) is along the suspension longitudinal direction.

To the contrary, in the present embodiment, as shown in FIG. 18, the connecting beam 14E has a proximal-side beam 141E arranged so that its proximal-side beam longitudinal line 141E(L), which connects the center point of the proximal end 14a and a center point of a distal end, is brought closer to the suspension longitudinal center line CL as it extends in the distal side in the suspension longitudinal direction, and is inclined with respect to the expansion and contraction direction of each of the paired piezoelectric elements 60.

More specifically, although each of the paired piezoelectric elements 60 is arranged so that its expansion and contraction direction is along the suspension longitudinal direction as in the fourth embodiment, the proximal-side beam longitudinal line 141E(L) is inclined with respect to the expansion and contraction direction of the piezoelectric element 60 so as to be brought closer to the suspension longitudinal center line CL as it extends toward the distal side in the suspension longitudinal direction.

Furthermore, in both of the fourth embodiment and the present embodiment, the distal-side beam 142D is disposed so that a distal-side beam longitudinal line 142D(L), which connects a center point of the proximal end and a center point of the distal end 14b, is farther away from the suspension longitudinal center line CL as it extends toward the distal side in the suspension longitudinal direction.

That is, in the present embodiment, both of the longitudinal lines 141E(L), 142D(L) of the proximal-side beam 141E and the distal-side beam 142D are inclined with respect to the expansion and contraction direction of each of the paired piezoelectric elements 60.

The configuration makes it possible to more easily make an elastic deformation of the connecting beams 141E by the expansion and contraction motion of the paired piezoelectric elements 60, thereby improving the micro motion characteristic of the magnetic head slider 50 in the seek direction by the paired piezoelectric elements 60.

Further, since the proximal-side beam 141E is inclined so that the proximal-side beam longitudinal line 141E(L) is brought closer to the suspension longitudinal center line CL as it extends in the distal side in the suspension longitudinal direction, the configuration makes it possible to reduce the moment of inertia of the proximal-side beam 141E around the suspension longitudinal center line CL larger than the fourth embodiment, thereby raising the resonance frequency of the magnetic head suspension.

Sixth Embodiment

Hereinafter, still another embodiment of the magnetic head suspension according to the present invention will be described, with reference to the attached drawings.

Figure 19:
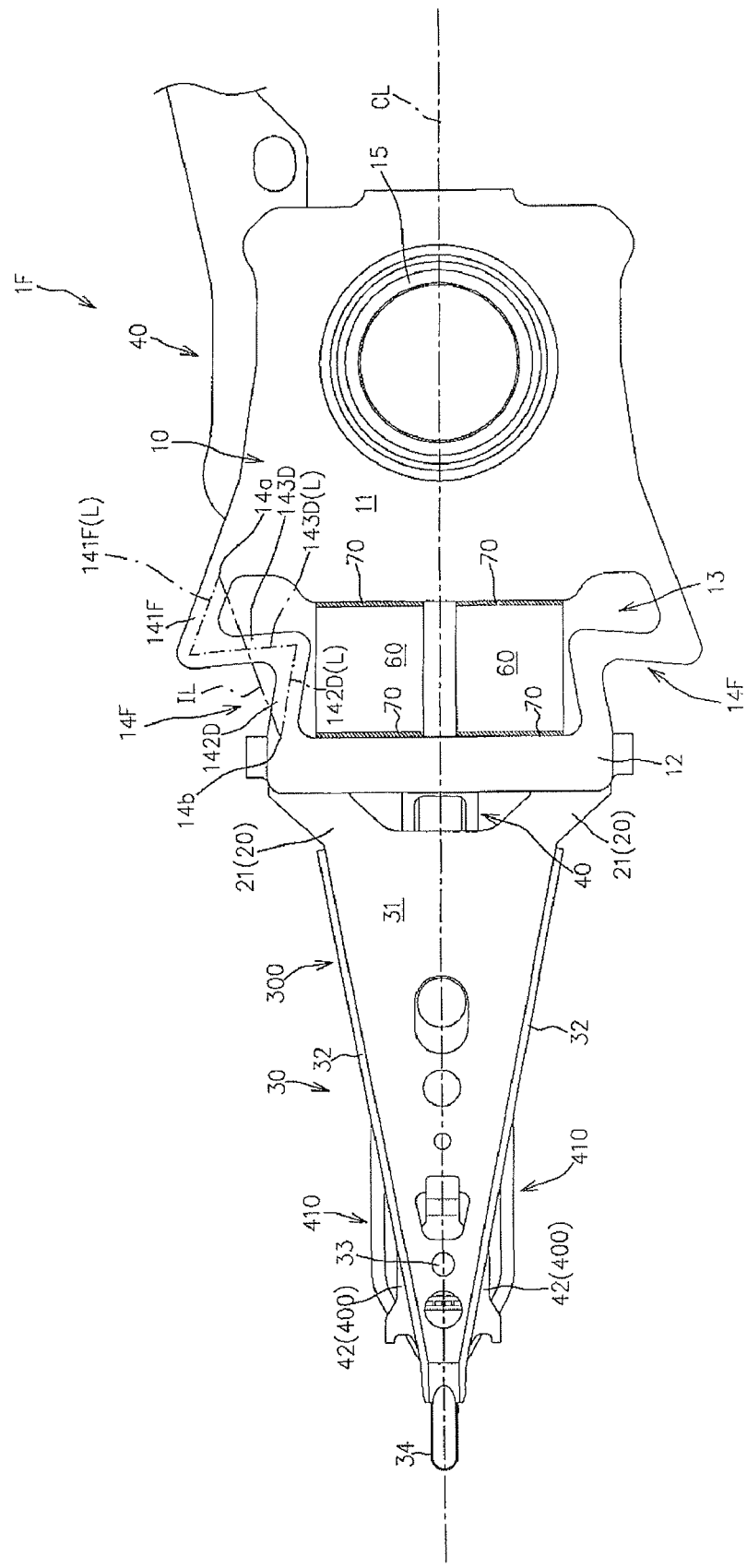
FIG. 19 is a top view of a magnetic head suspension according to a sixth embodiment of the present invention.

FIG. 19 is a top view (a plan view as viewed from a side opposite from the disk surface) of a magnetic head suspension 1F according to the present embodiment.

In the figure, the members same as those in the above-explained embodiments are denoted by the same reference numerals to omit the detailed description thereof.

The magnetic head suspension 1F according to the present embodiment is different from the magnetic head suspensions 1D, 1E in that the connecting beams 14D, 14E are replaced with connecting beams 14F.

In the present embodiment, each of the connecting beams 14F has a proximal-side beam 141F whose proximal-side beam longitudinal line 141F(L) is inclined with respect to the expansion and contraction direction of each of the paired piezoelectric elements 60 so as to be farther away from the suspension longitudinal center line CL as it extends in the distal side in the suspension longitudinal direction.

The configuration makes it also possible to more easily make an elastic deformation of the connecting beams 141F by the expansion and contraction motion of the paired piezoelectric elements 60, thereby improving the micro motion characteristic of the magnetic head slider 50 in the seek direction by the paired piezoelectric elements 60.

Further, in the present embodiment, each of the connecting beams 14F is configured so that both the distal-side beam longitudinal line 142D(L) and the proximal-side beam longitudinal line 141F(L) are farther away from the suspension longitudinal center line CL as it extends toward the distal side in the suspension longitudinal direction.

That is, the distal-side beam longitudinal line 142D(L) and the proximal-side beam longitudinal line 141F(L) are inclined in the same side with the suspension longitudinal direction being as a reference.

The configuration makes it possible to make an elastic deformation of the connecting beams 14F without difficulty in either case of expansion or contraction of the piezoelectric element 60.

Preferably, as shown in FIG. 20, a proximal-side beam 141F' whose width becomes narrower as it extends from the proximal side to the distal side in the suspension longitudinal direction may be adopted.

A magnetic head suspension 1F' according to the modified example makes it possible to raise resonance frequencies in the bending mode, the torsion mode and the main resonance mode.

It is of course possible that the proximal-side beam 141F' whose width becomes narrower as it extends from the proximal side to the distal side in the suspension longitudinal direction is adopted to the magnetic head suspensions 1D, 1E according to the fourth and fifth embodiments.

What is claimed is:

1. A magnetic head suspension comprising a load bending part that generates a load for pressing a magnetic head slider toward a disk surface, a load beam part that transmits the load to the magnetic head slider, a supporting part that supports the load beam part via the load bending part and is swung about a swing center directly or indirectly by a main actuator, a flexure part that is supported by the load beam part and the supporting part while supporting the magnetic head slider, and paired right and left piezoelectric elements that are attached to the supporting part so as to be symmetrical with each other with respect to a suspension longitudinal center line and have expansion and contraction directions different from each other, in order to enable micro motion of the magnetic head slider in a seek direction, wherein the magnetic head suspension further comprises a distal-end-side support plate, which is connected to a lower surface of the supporting part that faces the disk surface and on which lower surfaces, on the distal sides, of the paired piezoelectric elements that face the disk surface are mounted, wherein the supporting part includes a proximal end section that is directly or indirectly connected to the main actuator, a distal end section to which the load bending part is connected, an open section that is positioned between the proximal end section and the distal end section in a suspension longitudinal direction, and paired right and left connecting beams that are positioned on both sides of the open section in a suspension width direction and connect the proximal end section and the distal end section, wherein each of the paired piezoelectric elements is arranged within the open section so that an end surface on a distal end side and an end surface on a proximal end side of the piezoelectric element are opposed at least partially to a proximal end surface of the distal end section and a distal end surface of the proximal end section, respectively, wherein the end surface on the distal end side of the piezoelectric element is fixed to the proximal end surface of the distal end section by an insulative adhesive agent and the lower surface, on the distal side, of the piezoelectric element is fixed to the distal-end-side support plate by an insulative adhesive agent while the end surface on the proximal end side of the piezoelectric element is fixed to the distal end surface of the proximal end section by an insulative adhesive agent, wherein each of the paired connecting beams includes a proximal-side beam that linearly extends from a proximal end connected to the proximal end section to a distal end, and a distal-side beam that linearly extends from a proximal end connected to the proximal-side beam to a distal end connected to the distal end section, wherein the distal-side beam is inclined with respect to the proximal-side beam in a plan view such that a connection point between the proximal-side beam and the distal-side beam is located closer to the suspension longitudinal center line relative to a virtual line connecting the proximal end of the proximal-side beam and the distal end of the distal-side beam, and wherein the distal-end-side support plate is connected to the lower surface of the supporting part so as to form a gap between a distal edge of the distal-end-side support plate and a proximal edge of the distal end section in a plan view as viewed along a direction perpendicular to the disk surface.

2. A magnetic head suspension according to claim 1, wherein the proximal-side beam is inclined so as to be, brought closer to the suspension longitudinal center line as extending from the proximal end to the distal end.

3. A magnetic head suspension according to claim 1, wherein the load beam part, the load bending part and the distal-end-side support plate are integrally formed by a single member.

4. A magnetic head suspension according to claim 1, wherein the supporting part is a base plate including a boss portion to which a distal end of a carriage arm is joined by a swage processing, the carriage arm being connected to the main actuator.

5. A magnetic head suspension comprising a load bending part that generates a load for pressing a magnetic head slider toward a disk surface, a load beam part that transmits the load to the magnetic head slider, a supporting part that supports the load beam part via the load bending part and is swung about a swing center directly or indirectly by a main actuator, a flexure part that is supported by the load beam part and the supporting part while supporting the magnetic head slider, and paired right and left piezoelectric elements that are attached to the supporting part so as to be symmetrical with each ot with respect to a suspension longitudinal center line and have expansion and contraction directions different from each other, in order to enable micro motion of the magnetic head slider in a seek direction, wherein the magnetic head suspension further comprises a proximal-end-side support plate, which is connected to a lower surface of the supporting part that faces the disk surface and on which lower surfaces, on the proximal sides, of the paired piezoelectric elements that face the disk surface are mounted, wherein the supporting part includes a proximal end section that is directly or indirectly connected to the main actuator, a distal end section to which the load bending part is connected, an mien section that is positioned between the proximal end section and the distal end section in a suspension longitudinal direction, and paired right and left connecting beams that are positioned on both sides of the open section in a suspension width direction and connect the proximal end section and the distal end section, wherein each of the paired piezoelectric elements is arranged within the open section so that an end surface on a distal end side and an end surface on a proximal end side of the piezoelectric element are opposed at least partially to a proximal end surface of the distal end section and a distal end surface of the proximal end section, respectively, wherein the end surface on the distal end side of the piezoelectric element is fixed to the proximal end surface of the distal end section by an insulative adhesive agent while the end surface on the proximal end side of the piezoelectric element is fixed to the distal end surface of the proximal end section by an insulative adhesive agent and the lower surface, on the proximal side, of the piezoelectric element is fixed to the proximal-end-side support plate by an insulative adhesive agent, wherein each of the paired connecting beams includes a proximal-side beam that linearly extends from a proximal end connected to the proximal end section to a distal end, and a distal-side beam that linearly extends from a proximal end connected to the proximal-side beam to a distal end connected to the distal end section, wherein the distal-side beam is inclined with respect to the proximal-side beam in a plan view such that a connection point between the proximal-side beam and the distal-side beam is located closer to the suspension longitudinal center line relative to a virtual line connecting the proximal end of the proximal-side beam and the distal end of the distal-side beam, and wherein the proximal-end-side support plate is connected to the lower surface of the supporting part so as to form a gap between a proximal edge of the proximal-end-side support plate and a distal edge of the proximal end section in a plan view as viewed along a direction perpendicular to the disk surface.

6. A magnetic head suspension according to claim 5, wherein the supporting part includes first and second plate-like members that are overlapped with and fixed to each other, wherein the first plate-like member integrally includes a region corresponding to the proximal end section, a region corresponding to the paired connecting beams, and a region corresponding to the distal end section, and wherein the second plate-like member integrally includes a region corresponding to the proximal end section, and a region corresponding to the proximal-end-side support plate.

* * * * *